United States Patent
Katayose et al.

[11] Patent Number: 6,003,959
[45] Date of Patent: Dec. 21, 1999

[54] VEHICLE DYNAMICS CONTROL SYSTEM

[75] Inventors: Shinji Katayose, Tokyo; Masamichi Imamura, Kanagawa, both of Japan

[73] Assignee: Unisia Jecs Corporation, Atsugi, Japan

[21] Appl. No.: 08/986,931

[22] Filed: Dec. 8, 1997

[30] Foreign Application Priority Data

Dec. 10, 1996 [JP] Japan ................................ 8-351932

[51] Int. Cl.$^6$ ........................................................ B60T 8/32
[52] U.S. Cl. ......................... 303/146; 303/147; 303/140
[58] Field of Search .................................. 303/146, 147, 303/148, 139, 140; 701/72; 318/587, 586

[56] References Cited

U.S. PATENT DOCUMENTS

| | | | |
|---|---|---|---|
| 4,898,431 | 2/1990 | Karnopp et al. | 303/100 |
| 5,134,352 | 7/1992 | Matsumoto et al. | 701/72 |
| 5,206,808 | 4/1993 | Inoue et al. | 303/146 |
| 5,267,783 | 12/1993 | Inoue et al. | 303/146 |
| 5,813,732 | 9/1998 | Monzaki et al. | 303/146 |

FOREIGN PATENT DOCUMENTS

| | | |
|---|---|---|
| 39 19347 | 2/1990 | Germany . |
| 197 22716 | 3/1998 | Germany . |
| 8-133039 | 5/1996 | Japan . |

OTHER PUBLICATIONS

"Dynamic Driving Control System"; Bosch; 1994; pp. 674–678 and 683–689.

*Primary Examiner*—Douglas C. Butler
*Attorney, Agent, or Firm*—Foley & Lardner

[57] ABSTRACT

A vehicle dynamics control system for an automotive vehicle with a parallel split layout of brake circuits comprises a tandem master cylinder, a hydraulic pump fluidly disposed in one brake circuit, a selector valve for selecting a brake-fluid pressure to be fed to a first brake line from between the fluid pressure generated from the pump and the master-cylinder pressure, a plurality of pressure control valves for regulating a fluid pressure in each individual wheel-brake cylinder, vehicle sensors for detecting a vehicle's cornering behavior, and a control unit being responsive to the sensor's input information for controlling the respective control valves associated with the front wheel-brake cylinders. The control unit operates to supply the fluid pressure generated from the pump to an inner front wheel-brake cylinder in the vehicle understeer on turns. The control unit also operates to supply the fluid pressure generated from the pump to an outer front wheel-brake cylinder in the vehicle oversteer on turns.

8 Claims, 13 Drawing Sheets

VEHICLE DYNAMICS CONTROL SYSTEM

BACKGROUND OF THE INVENTION

1. Field of the Invention

The present invention relates to a vehicle dynamics control system, and specifically to a system which is capable of automatically controlling or compensating for the vehicle's cornering behavior or vehicle's turning behavior or steer characteristics such as understeer or oversteer on turns by automatically properly controlling or regulating the hydraulic brake pressure applied to the individual wheel-brake cylinders.

2. Description of the Prior Art

As is generally known, an automotive vehicle has front-left, front-right, rear-left and rear-right wheel-brake cylinders respectively connected to a master cylinder where hydraulic pressure is developed by depression of a brake pedal. In recent years, the hydraulic brake system has been split into two independent sections, so that, if one brake section fails owing to damage or brake-fluid leakage, the other section will provide braking. Such a hydraulic brake system is called a "dual brake system". A dual-brake system master cylinder has two pistons, set in tandem. The brake pedal (the foot pedal) actuates the two master-cylinder pistons and forces brake fluid along respective piping systems to individual wheel-brake cylinders (operating cylinders). Front-engine, rear-wheel-drive (FR) vehicles, generally use a so-called parallel split layout of brake circuits, in which one part of the tandem master cylinder output is connected via a first brake pipeline system to front-left and front-right wheel-brake cylinders and the other part is connected via a second brake pipeline system to rear-left and rear-right wheel-brake cylinders. In automobiles with such a parallel split layout of brake circuits, when the brake pedal is depressed by the driver and thus primary and secondary master-cylinder pistons are pushed, the brake-fluid pressure generated from one part of the master cylinder output and the brake-fluid pressure generated from the other part are supplied respectively via the first and second brake pipeline systems to front and rear wheel-brake cylinders, with the result that the negative wheel torque (resulting in a braking force) is applied to the individual wheels. As is generally known, when a vehicle is rounding a curve, owing to road surface conditions (so-called low-$\mu$ or high-$\mu$ roads), changes in the vehicle velocity, throttle-on or throttle-off conditions, or the like, the vehicle may often exhibit undesired steer characteristics, namely oversteer tendencies in which the actual radius of turn is less than the intended radius of turn or understeer tendencies in which the actual radius of turn is greater than the intended radius of turn. Oversteer is generally known as an under-response to steering input as by generation of excessive slip angle on rear road wheels, whereas understeer is generally known as an over-response to steering input as by generation of excessive slip angle on front road wheels. The driver must have a great deal of skill to avoid undesired understeer or oversteer by adjusting increase or decrease in steer angle only by way of the driver's braking or steering action. For the reasons set forth above, in recent years, there have been developed and proposed various active steer-characteristics control systems in which the vehicle's cornering behavior is automatically controlled or regulated by adjusting the brake-fluid pressure applied to each individual wheel-brake cylinder by means of an electronic control unit (ECU) or an electronic control module (ECM). One such vehicle's cornering behavior controller (simply a vehicle controller) has been disclosed in Japanese Patent Provisional Publication No. 8-133039. In the vehicle controller disclosed in the Japanese Patent Provisional Publication No. 8-133039, when the vehicle experiences understeer during turns, the vehicle controller operates to reduce the brake-fluid pressure in the wheel-brake cylinder of the front road wheel rotating on the outside and simultaneously to build up the brake-fluid pressure in the wheel-brake cylinder of the rear road wheel rotating on the inside, by way of an automatic control, thereby avoiding understeer. On the contrary, when the vehicle experiences oversteer on turns, the vehicle controller operates to build up the brake-fluid pressure in the wheel-brake cylinder of the front road wheel rotating on the outside and at the same time to reduce the brake-fluid pressure in the wheel-brake cylinder of the rear road wheel rotating on the inside, by way of an automatic control, thereby avoiding oversteer. As previously discussed, the Japanese Patent Provisional Publication No. 8-133039 teaches the increase in brake-fluid pressure in the rear wheel-brake cylinder on the inside to avoid understeer during turns. However, on turns, the car weight is usually transferred to the outside front wheel. Thus, the magnitude of wheel load acting on the inner rear wheel tends to become the minimum value during turns, as compared with the other road wheels. For the reasons discussed above, even if, on turns, the brake-fluid pressure in the rear wheel-brake cylinder on the inside is built up by means of the conventional vehicle controller, it may be impossible to carry out adequate braking effect, and thus it may be difficult to effectively avoid understeer tendencies owing to load transfer to the outer front wheel during turns. Additionally, in front-engine, rear-wheel-drive (FR) vehicles, a so-called parallel split layout of brake circuits is generally used. Assuming that the system disclosed in the previously-noted Japanese Patent Provisional Publication No. 8-133039 is applied to a front-engine, rear-wheel-drive vehicle with a parallel-split layout of brake circuits, the front-section brake pipeline system and the rear-section brake pipeline system must be both disconnected from the dual master cylinder once and in lieu thereof the two brake pipeline systems must be connected to the respective hydraulic pumps serving as an external fluid-pressure source, while the automatic control is executed with regard to both the outer front road wheel and the diagonally-opposed inner rear road wheel under the understeer or oversteer state condition on turns. Therefore, while the automatic control is actually executed to avoid understeer or oversteer on turns, the master-cylinder pressure cannot be directed to the respective wheel-brake cylinder, and thus the vehicle cannot be decelerated according to the driver's wishes (or the magnitude of the driver's foot pedal depression).

SUMMARY OF THE INVENTION

Accordingly, it is an object of the invention to provide a vehicle dynamics control system which avoids the aforementioned disadvantages of the prior art.

It is another object of the invention to provide a vehicle dynamics control system for an automotive vehicle with a so-called parallel split layout of brake circuits, which effectively compensates for the undesired vehicle's cornering behavior (understeer or oversteer) toward neutral steer.

In order to accomplish the aforementioned and other objects of the present invention, a vehicle dynamics control system for an automotive vehicle with a parallel split layout of brake circuits comprises a first brake line connected to a pair of front-left and front-right wheel-brake cylinders, a second brake line connected to a pair of rear-left and rear-right wheel-brake cylinders, a first brake-fluid pressure generator for generating a first brake-fluid pressure which is variable depending on a magnitude of brake-pedal depression, a second brake-fluid pressure generator for generating a second brake-fluid pressure, independently of the first brake-fluid pressure based on the magnitude of brake-pedal depression, a brake-fluid pressure selector valve means for selecting a brake-fluid pressure to be fed to the first brake line from between the first and second brake-fluid pressures, a first pressure control valve means fluidly disposed in a first brake circuit including the first brake line for regulating a fluid pressure in the front-left wheel-brake cylinder, a second pressure control valve means fluidly disposed in the first brake circuit including the first brake line for regulating a fluid pressure in the front-right wheel-brake cylinder, a vehicle-behavior detector for detecting a vehicle's cornering behavior, and a brake-fluid pressure control means being responsive to input information from the vehicle-behavior detector for controlling the brake-fluid pressure selector valve means and the first and second pressure control valve means, wherein the brake-fluid pressure control means operates to supply the second brake-fluid pressure to an inner front wheel-brake cylinder of the front-left and front-right wheel-brake cylinders when the input information from the vehicle-behavior detector indicates a vehicle understeer during a turn, and operates to supply the second brake-fluid pressure to an outer front wheel-brake cylinder of the front-left and front-right wheel-brake cylinders when the input information from the vehicle-behavior detector indicates a vehicle oversteer during a turn. It is preferable that the brake-fluid pressure control means operates to reduce a fluid pressure in an outer front wheel-brake cylinder of the front-left and front-right wheel-brake cylinders when the input information from the vehicle-behavior detector indicates the vehicle understeer during a turn, and operates to reduce a fluid pressure in an inner front wheel-brake cylinder of the front-left and front-right wheel-brake cylinders when the input information from the vehicle-behavior detector indicates the vehicle oversteer during a turn. The first brake-fluid pressure generator may comprise a dual-brake system master cylinder with two pistons set in tandem. The second brake-fluid pressure generator may comprise a single-directional type electric-motor driven hydraulic pump being disposed in the first brake circuit. The vehicle-behavior detector may comprise at least wheel speed sensors for monitoring front-left, front-right, rear-left and rear-right wheel speeds, a yaw-velocity sensor for monitoring a yaw velocity about a z-axis of the vehicle, a lateral acceleration sensor for monitoring a lateral acceleration exerted on the vehicle, and a steering angle sensor for monitoring a steer angle.

DESCRIPTION OF THE PREFERRED EMBODIMENTS

Figure 2:
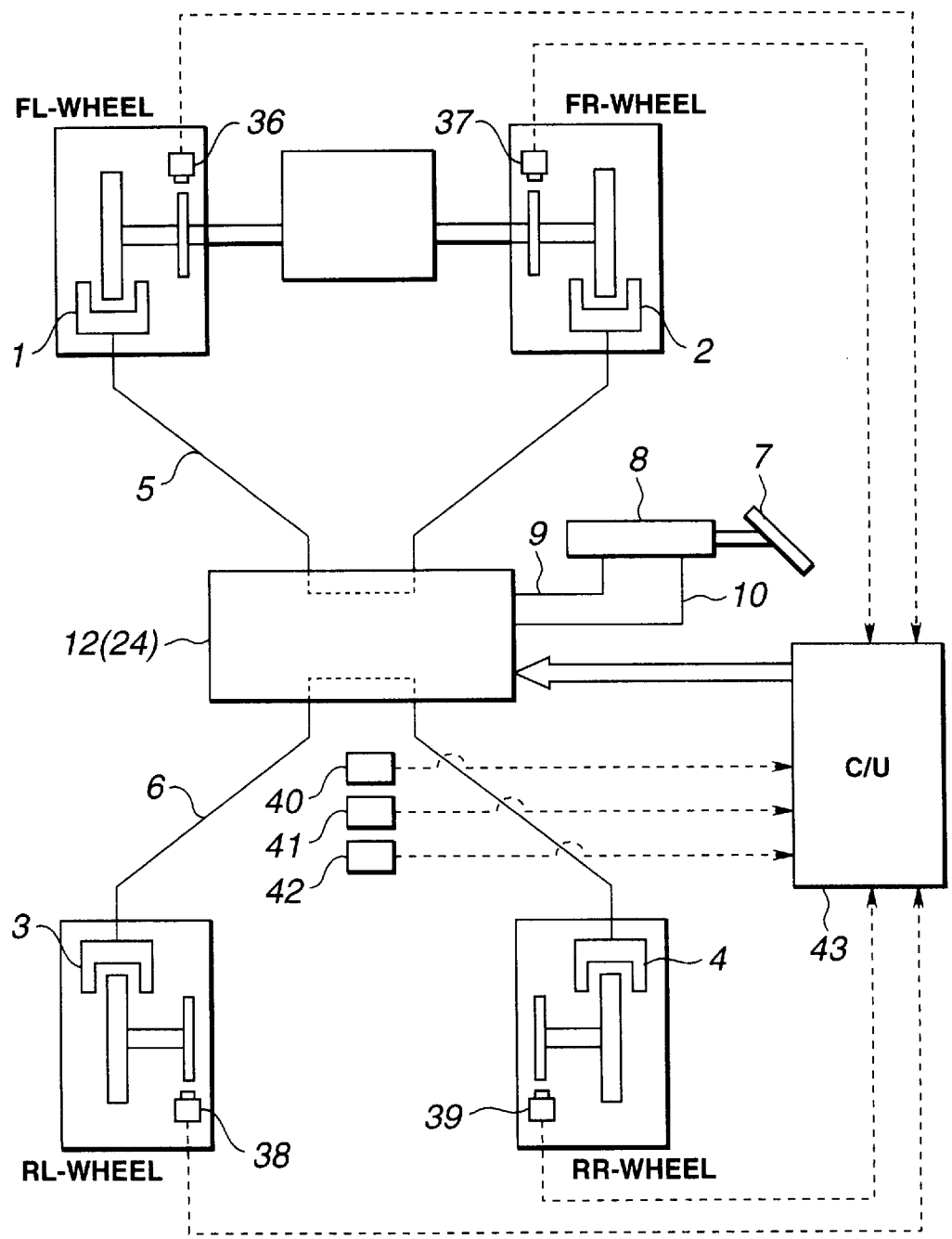
FIG. 2 is a system block diagram illustrating one embodiment of the vehicle dynamics control system of the invention.
Figure 3:
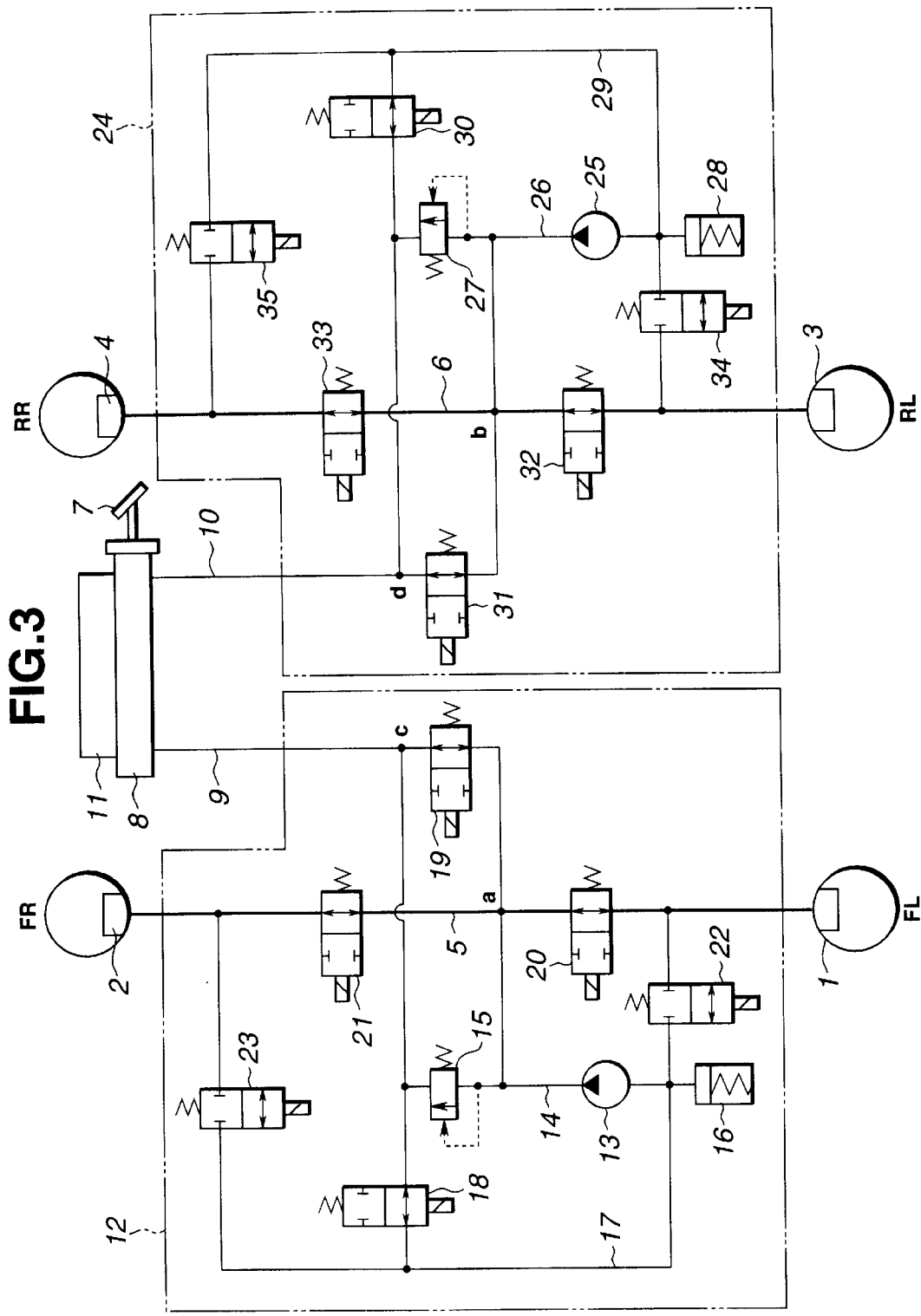
FIG. 3 is a hydraulic circuit diagram illustrating a hydraulic circuit being applicable to the vehicle dynamics control system of the embodiment.

Referring now to the drawings, particularly to FIGS. 2–15, there is shown the vehicle dynamics control system of the embodiment. The hydraulic circuits employed in the vehicle dynamics control system of the embodiment is hereinbelow described in detail by reference to FIGS. 2 and 3. Component parts denoted by reference signs 1 and 2 respectively correspond to front-left and front-right wheel-brake cylinders, whereas component parts denoted by reference signs 3 and 4 respectively correspond to rear-left and rear-right wheel-brake cylinders. A line denoted by reference sign 5 is a first brake pipeline connected to both the front-left and front-right wheel-brake cylinders 1 and 2, whereas a line denoted by reference sign 6 is a second brake pipeline connected to both the rear-left and rear-right wheel-brake cylinders 3 and 4. That is to say, the vehicle of FIG. 2 uses a so-called parallel split layout of brake circuits. The brake pipelines 5 and 6 are provided for directing the brake-fluid pressure from a dual-brake system master cylinder 8 (a tandem master cylinder) or a fluid-pressure control pumps 13 or 25 to each of the wheel-brake cylinders 1 to 4. The tandem master cylinder 8 has two pistons which are linked to a brake pedal 7, so that, in operation, depression of the brake pedal 7 forces the primary and secondary master-cylinder pistons to axially slide in the master cylinder. The sliding movement of the pistons applies pressure to fluid ahead of each of the pistons, forcing the fluid through the first and second brake lines 5 and 6 to the wheel-brake cylinders 1, 2, 3 and 4. That is, the tandem master cylinder 8 serves as a brake-fluid pressure source (or a brake fluid pressure generator means). As seen in FIGS. 2 and 3, the primary brake outlet port of the master cylinder 8 is connected through a primary fluid-supply conduit 9 to the brake line 5 at a connecting point a, whereas the secondary brake outlet port of the master cylinder is connected through a secondary fluid-supply conduit 10 to the brake line 6 at a connecting point b. Reference sign 11 denotes a brake-fluid reservoir from which brake fluid is fed to the master cylinder 8. Reference sign 12 denotes a front-section brake-fluid pressure control unit (or a front-section hydraulic modulator) for controlling or regulating or modulating the brake-fluid pressure to each of the front-left and front-right wheel-brake cylinders 1 and 2. The front-section hydraulic modulator 12 is provided for a vehicle dynamics control, which will be fully described later, and an anti-lock brake control (often called an "ABS control") for the front wheel-brake cylinders 1 and 2. Similarly, the rear-section hydraulic modulator 24 is provided mainly for executing an anti-lock brake control (ABS control) for the rear wheel-brake cylinders 3 and 4. As seen in FIG. 3, the fluid-pressure control pump 13 is fluidly disposed in a fluid line 14, whereas the fluid-pressure control pump 25 is fluidly disposed in a fluid line 26. The fluid-pressure control pump 13 serves as a controlled brake fluid pressure generator means. On the other hand, the fluid-pressure control pump 25 serves as an ABS return pump during the ABS control. The outlet port of the pump 13 is connected through the line 14 to the first brake line 5 at the connecting point a, while the inlet port of the pump 13 is connected to a primary reservoir 16. On the other hand, the outlet port of the pump 25 is connected through the line 26 to the second brake line 6 at the connecting point b, while the inlet port of the pump 25 is connected to a secondary reservoir 28. The two pumps 13 and 25 are usually in stopped states (OFF conditions). The pump 13 is driven by a control signal generated from an electronic control unit 43 discussed later. Actually, the pump 13 is driven in accordance with the vehicle dynamics control routine, which will be fully described later, to avoid undesired vehicle's cornering behavior (excessive understeer or oversteer), or driven in accordance with the ABS control routine, thereby feeding the brake fluid pumped to the brake line 5, independently of the master-cylinder pressure produced by depression of the brake pedal 7. To regulate the discharge pressure of the pump 13, a primary relief valve 15 is fluidly disposed in the line 14. The reservoir 16 connected to one end of the line 14 is provided to temporarily store a small amount of brake fluid returned from the wheel-brake cylinders 1 and 2 under a particular condition in which a by-pass line 17 communicates with the first brake line 5 (the inlet/outlet ports of the wheel-brake cylinders 1 and 2) with the fluid-pressure control valves 22 and 23 fully opened. On the other hand, the reservoir 28 connected to one end of the line 26 is provided to temporarily store a slight brake fluid returned from the wheel-brake cylinders 3 and 4 under a particular condition in which a by-pass line 29 communicates with the second brake line 6 (the inlet/outlet ports of the wheel-brake cylinders 3 and 4) with the fluid-pressure control valves 34 and 35 fully opened. As seen in FIG. 3, one end of the by-pass line 17 is connected to the primary fluid-supply line 9 at a connecting point c, while the other end is connected to the primary reservoir 16. Similarly, one end of the by-pass line 29 is connected to the secondary fluid-supply line 10 at a connecting point d, while the other end is connected to the secondary reservoir 28. A primary directional control valve 18 is fluidly disposed in the by-pass line 17 extending between the connecting point c and the primary reservoir 16, whereas a secondary directional control valve 30 is fluidly disposed in the by-pass line 29 extending between the connecting point d and the secondary reservoir 28. In the shown embodiment, each of the two directional control valves 18 and 30 is comprised of a typical two-port, two-position, normally-closed type electro-magnetic directional control valve. The open and closed positions of each of the directional control valves 18 and 30 are switchable in response to a control signal generated from the control unit 43. During the vehicle dynamics control mode, the brake pedal 7 is not always depressed. So, the brake fluid must be forcibly supplied from the master-cylinder reservoir 11 towards the inlet port of the control pump 13, to execute the automatic proper vehicle dynamics control. Therefore, as soon as the vehicle dynamics control is brought into operation, the directional control valve 18 is switched to open in response to a command signal from the control unit 43, thereby permitting the brake-fluid supply from the reservoir 11 via the directional control valve 18 to the inlet of the pump 13. A primary fluid-pressure selector valve 19 is fluidly disposed in the primary fluid-supply line 9, while a secondary fluid-pressure selector valve 31 is fluidly disposed in the secondary fluid-supply line 10. Each of the two fluid-pressure selector valves 19 and 31 is comprised of a typical two-port, two-position, normally-open type electro-magnetic directional control valve. In the hydraulic circuit of shown in FIG. 3, the primary fluid-pressure selector valve 19 functions as a brake-fluid pressure selector means which directs either one of the brake-fluid pressure output from the primary master-cylinder outlet port or the brake-fluid pressure output from the control pump 13 to the first brake line 5. A first pair of fluid-pressure control valves 20 and 21 are fluidly disposed in the first brake line 5. Similarly, a second pair of fluid-pressure control valves 32 and 33 are fluidly disposed in the second brake line 6. In the shown embodiment, each of the four fluid-pressure control valves 20, 21, 32 and 33 is comprised of a typical two-port, two-position, normally-open type electromagnetic solenoid valve. One port of the pressure control valve 20 is connected to the inlet/outlet port of the front-left wheel-brake cylinder 1, and the other port is connected via the connecting point a to one port of the selector valve 19. One port of the pressure control valve 21 is connected to the inlet/outlet port of the front-right wheel-brake cylinder 2, and the other port is connected via the connecting point a to the one port of the selector valve 19. One port of the pressure control valve 32 is connected to the inlet/outlet port of the rear-left wheel-brake cylinder 3, and the other port is connected via the connecting point b to one port of the selector valve 31 (the ABS directional control valve). One port of the pressure control valve 33 is connected to the inlet/outlet port of the rear-right wheel-brake cylinder 4, and the other port is connected via the connecting point b to the one port of the selector valve 31. Four fluid-pressure control valves 22, 23, 34 and 35 are fluidly disposed in the respective return lines to return brake fluid from the respective individual wheel-brake cylinders to the inlet ports of the pumps 13 and 25. Each of the fluid-pressure control valves 22, 23, 34 and 35 is comprised of a typical two-port, two-position, normally-closed type electromagnetic solenoid valve. The pressure control valve 22 is fluidly disposed in a return line being connected between the inlet/outlet port of the front-left wheel-brake cylinder 1 and the primary reservoir 16, so that the inflow port of the valve 22 is connected to the first brake line 5 near the port of the wheel cylinder 1 and the outflow port of the valve 22 is connected via a portion of the primary by-pass line 17 to the reservoir 16. The pressure control valve 23 is fluidly disposed in a return line being connected between the inlet/outlet port of the front-right wheel-brake cylinder 2 and the reservoir 16, so that the inflow port of the valve 23 is connected to the first brake line 5 near the port of the wheel cylinder 2 and the outflow port of the valve 23 is connected directly to the reservoir 16. The pressure control valve 34 is fluidly disposed in a return line being connected between the inlet/outlet port of the rear-left wheel-brake cylinder 3 and the secondary reservoir 28, so that the inflow port of the valve 34 is connected to the second brake line 6 near the port of the wheel cylinder 3 and the outflow port of the valve 34 is connected via a portion of the secondary by-pass line 29 to the reservoir 28. The pressure control valve 35 is fluidly disposed in a return line being connected between the inlet/outlet port of the rear-right wheel-brake cylinder 4 and the reservoir 28, so that the inflow port of the valve 35 is connected to the second brake line 6 near the port of the wheel cylinder 4 and the outflow port of the valve 35 is connected directly to the reservoir 28. The on/off reaction of each of the pressure control solenoid valves 22, 23, 34 and 35 is controlled in response to a control signal generated from the control unit 43. Particularly, the on/off reaction of each of the pressure control solenoid valves 20 and 22 associated with the front-left wheel-brake cylinder 1 and the pressure control solenoid valves 21 and 23 associated with the front-right wheel-brake cylinder 2 can be controlled in response to a control signal generated from the control unit 43 in the form of a pulse signal (namely a pressure build-up pulse signal, a pressure-reduction pulse signal, and a pressure-hold pulse signal). The fluid-pressure control operation of the front-section hydraulic modulator 12 with regard to front wheel-brake cylinders 1 and 2 connected to the first brake line 5 will be hereinafter described in detail. On the other hand, the rear-section hydraulic modulator 24, which has an essentially same construction as the front-section hydraulic module 12 and provided for the fluid pressure control for the rear wheel-brake cylinders 3 and 4, contributes mainly to the ABS control for the rear wheel-brake cylinder pressures. Thus, the hydraulic pump 25, the valves 30, 31, 32, 33, 34 and 35 shown in FIG. 3 will be hereinafter referred to respectively as "ABS control pump 25", "ABS directional control valve 30", "ABS fluid-pressure selector valve 31", and "ABS pressure-control valves 32–35". A valve denoted by reference sign 27 is a secondary relief valve fluidly disposed in the line 26 for regulating the discharge pressure from the ABS control pump 25. The ABS control pump 25 is driven by a control signal generated from the control unit 43 in the execution cycle of the ABS control. The ABS control which is executed with respect to the rear wheel-brake cylinder 3 and 4 is conventional and forms no part of the present invention, and thus detailed description of the rear-section hydraulic modulator 24 will be omitted.

When the brake-fluid pressure (essentially equal to the master-cylinder pressure) produced by the master cylinder 8 must be directed to the first brake line 5 connected to the front wheel-brake cylinders 1 and 2, as shown in FIG. 3, the hydraulic modulator 12 operates to maintain the fluid-pressure selector valve 19 at its full fluid-communication position (a full open position) and simultaneously to maintain the pressure control valves 20 and 21 at their full fluid-communication positions (full open positions) and to maintain the pressure control valves 22 and 23 disposed in the return line at their shut-off positions (fully-closed positions). Under these conditions, depression of the brake pedal 7 results in a rise of fluid pressure in the master cylinder. The fluid pressure is directed from the master-cylinder outlet port through the fluid-supply conduit 9 and the first brake line 5 to the two front wheel-brake cylinders 1 and 2. As a consequence, the braking force acting on each of front-left and front-right road wheels is freely controllable or adjustable by adjusting the magnitude of depression of the brake pedal 7 by the driver's foot. On the contrary, when the brake-fluid pressure produced by the pump 13 has to be delivered to the front-left wheel-brake cylinder 1, the hydraulic modulator 12 operates to switch the selector valve 19 to its shut-off position, and simultaneously to maintain the pressure control valve 20 at the full fluid-communication position, and to maintain the pressure control valve 22 at the shut-off position, and to shift the pressure control valve 21 to the shut-off position. Under these conditions, when the control pump 13 is driven in response to the control signal from the control unit 43, the fluid pressure produced by the pump 13 is applied to the front-left wheel cylinder 1 via the first brake line 5, with the result that the braking force acting on the front-left road wheel increases under the increased front-left wheel cylinder pressure. Likewise, when the brake-fluid pressure produced by the pump 13 has to be delivered to the front-right wheel-brake cylinder 2, the hydraulic modulator 12 operates to switch the selector valve 19 to its shut-off position, and simultaneously to shift the pressure control valve 20 at the shut-off position, and to maintain the pressure control valve 23 at the shut-off position, and to switch the pressure control valve 21 to the full fluid-communication position (the full-open position). Under these conditions, when the control pump 13 is driven in response to the control signal from the control unit 43, the fluid pressure produced by the pump 13 is applied to the front-right wheel cylinder 2 via the first brake line 5, with the result that the braking force acting on the front-right road wheel increases under the increased front-right wheel cylinder pressure. In the vehicle dynamics control system of the embodiment, the front-left wheel-brake cylinder pressure and/or the front-right wheel-brake cylinder pressure must be often kept constant at the pressure hold mode (in presence of the output of pressure-hold pulse signal) or reduced at the pressure reduction mode (in presence of the output of pressure-reduction pulse signal), even during operation of the pump 13. During operation of the pump 13, when the front-left wheel cylinder pressure must be kept constant, the hydraulic modulator 12 operates to switch the fluid-pressure control valves 20 and 22 to the shut-off positions. When the front-right wheel cylinder pressure must be kept constant, the hydraulic modulator 12 operates to switch the fluid-pressure control valves 21 and 23 to the shut-off positions. When the front-left wheel cylinder pressure must be reduced, the hydraulic modulator 12 operates to switch the fluid-pressure control valve 20 to the shut-off position and simultaneously to switch the fluid-pressure control valve 22 to the full fluid-communication position. As a result, the brake fluid within the wheel cylinder 1 flows via the valve 22 to the reservoir 16 and thus the fluid pressure within the wheel cylinder 1 is fallen. The pressure fall within the front-left wheel-brake cylinder 1 results in reduction in the braking force acting on the front-left road wheel or tire. When the front-right wheel cylinder pressure must be reduced, the hydraulic modulator 12 operates to switch the fluid-pressure control valve 21 to the shut-off position and simultaneously to switch the fluid-pressure control valve 23 to the full fluid-communication position. As a result, the brake fluid within the wheel cylinder 2 flows via the valve 23 to the reservoir 16 and thus the fluid pressure within the wheel cylinder 2 is fallen. The pressure fall within the front-right wheel-brake cylinder 2 results in reduction in the braking force acting on the front-right road wheel or tire.

The electronic control unit (C/U) 43 is hereinbelow described in greater detail by reference to FIGS. 2 and 4.

Figure 4:
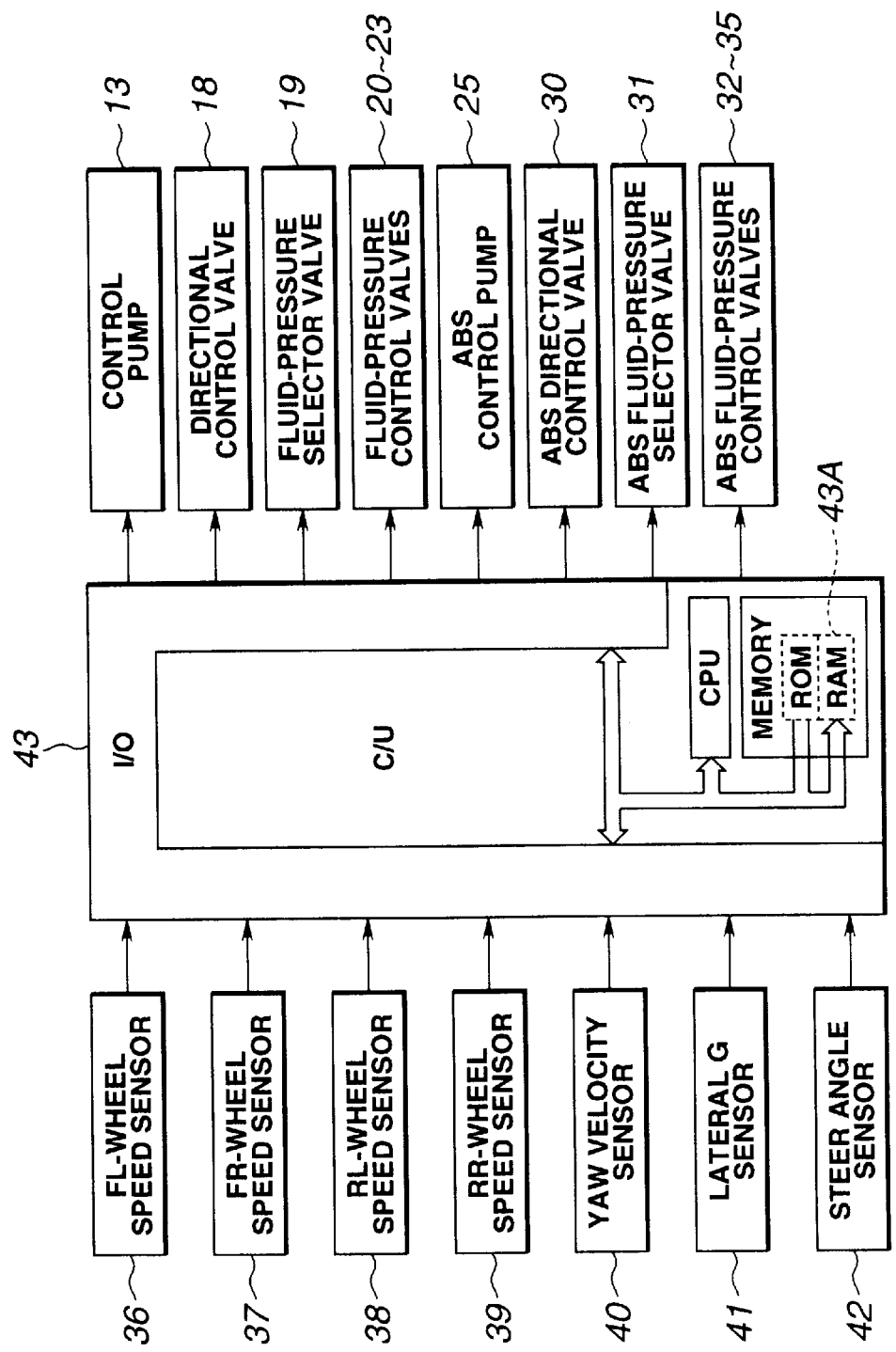
FIG. 4 is a block diagram of an electronic control unit (ECU or C/U) being applicable to the vehicle dynamics control system of the embodiment.

As seen in FIG. 4, the control unit 43 usually comprises a microcomputer which is generally constructed by an input interface circuit including an analog-to-digital (A/D) converter for converting an analog input information or data, such as each sensor signal from various vehicle sensors, to a digital signal, a central processing unit (CPU), memories (ROM, RAM) for pre-storing programs as shown in FIGS. 5 through 11, and for permanently storing a predetermined, programmed information and for temporarily storing the results of ongoing arithmetic calculations, and an output interface circuit generally including a digital-to-analog (D/A) converter and a special driver to handle or drive a larger load, that is, the electromagnetic solenoids of the previously-noted solenoid valves, and the pumps 13 and 25 each being comprised of a single-directional type electric-motor driven hydraulic pump. The previously-noted input and output interface circuits can be constructed individually, or in lieu thereof integrally formed as an input/output interface unit. In the shown embodiment, the control unit 43 includes an input/output interface unit. As shown in FIG. 2, vehicle sensors denoted by reference signs 36, 37, 38 and 39 are front-left, front-right, rear-left and rear-right wheel speed sensors for respectively monitoring front-left, front-right, rear-left and rear-right wheel speeds VFL, $V_{FR}$, $V_{RL}$ and $V_{RR}$. Each of the wheel speed sensors 36 through 39 is a typical pick-up coil type sensor which operates on a pulse-counter principle. A vehicle sensor denoted by 40 is a yaw-velocity sensor for monitoring a yaw velocity Y of the vehicle. The yaw-velocity sensor 40 is generally constructed by an angular velocity sensor for example a tuning-fork type strain gauge, which monitors a Coriolis force. A vehicle sensor denoted by 41 is a lateral acceleration sensor for monitoring a lateral acceleration G exerted on the vehicle. The lateral acceleration sensor 41 is generally constructed by an acceleration sensor such as a cantilever type strain gauge. A vehicle sensor denoted by 42 is a steering angle sensor for monitoring a steering angle (or a steer angle) D. The steering angle sensor 42 is generally constructed by an optical sensor including a photo-transistor, a potentiometer, or the like. The previously-discussed vehicle sensors 36 through 42 serve as a vehicle behavior detector means. As seen in FIG. 4, the input interface of the input/output interface unit (I/O) of the electronic control unit 43 is connected to the vehicle sensors 36 through 42 for receiving the wheel-speed indicative input information, the yaw-speed indicative input information, the lateral-acceleration indicative input information, and the steering angle indicative input information. On the other hand, the output interface of the I/O is connected to the electric motors of the pumps 13 and 25, the solenoids of the directional control valves 18 and 30, and the solenoids of the fluid-pressure selector valves 19 and 31, and the solenoids of the fluid-pressure control valves 20–35, to output drive signals (or control signals or command signals) thereto. As discussed above, the computer memory section 43A of the control unit 43 includes a random access memory (RAM) and a read only memory (ROM) for storing input information for example a predetermined oversteer reference value YWOBS, a predetermined understeer reference value YWUBS (see steps S12 and S15 of FIG. 6 and steps S20 and S23 of FIG. 7), a data table of a target yaw-velocity Yd, a data table of a target vehicle slip angle Ad, a predetermined pressure build-up threshold value Pz (see step S50 of FIG. 10), a predetermined pressure reduction threshold value Pg (see step S55 of FIG. 10), preset pressure-reduction time intervals Ta (see FIG. 9) and Tb (see FIG. 11), a predetermined time interval TINT (see steps S52 and S57 of FIG. 10), various programmed constants or values necessary for arithmetic calculations or the like. The control unit 43 also includes pressure-reduction counters Ca and Cb, a pressure build-up counter Cz, and a pressure-reduction interval counter Cg. As set forth above, the computer input/output interface unit of the control unit 43 allows vehicle sensor's input information data ($V_{FL}$, $V_{FR}$, $V_{RL}$, $V_{RR}$, Y, G, D) to be understood by the central processing unit (CPU) and storable by the memory section 43A. Also, the input/output interface unit reconverts output data into a language that the output device (the solenoids of each of the electromagnetic solenoid valves 18, 19, 20–23, 30, 31, and 32–35, and the electric motors of the pumps 13 and 25) can understand and comprehend. The arithmetic calculations (or the vehicle dynamics control routine) executed by the control unit 43 is hereinafter described in detail in accordance with the flow charts shown in FIGS. 5 through 11. This routine or program is executed as time-triggered interrupt routines to be triggered every predetermined time intervals.

Figure 5:
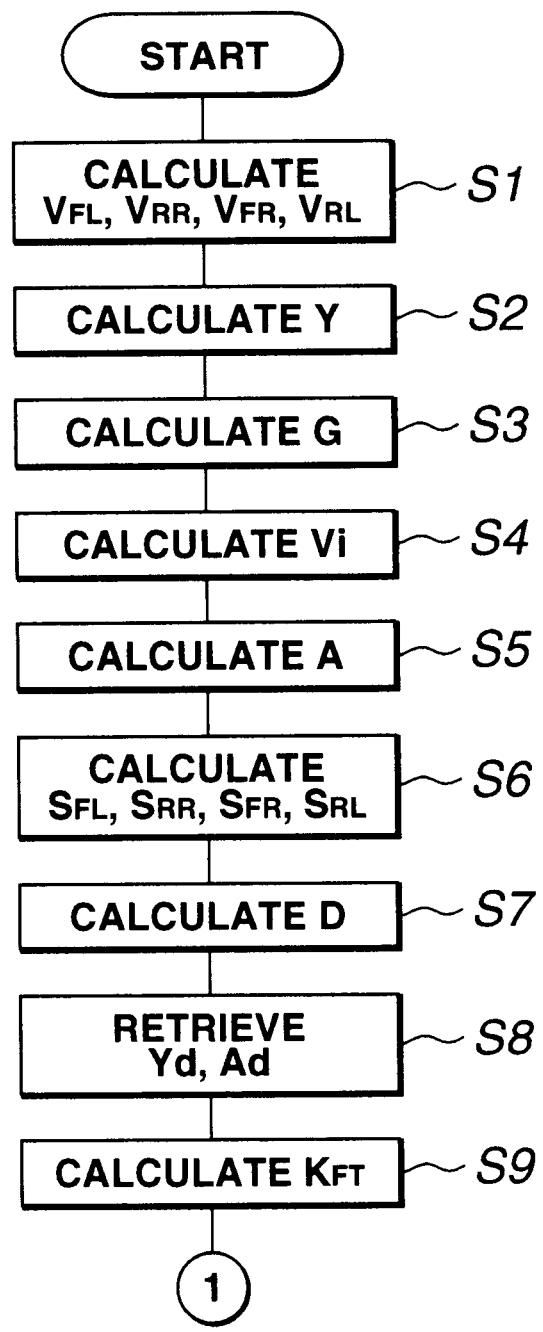
FIG. 5 is a flow chart illustrating a first series of steps (S1–S9) of a control routine (a vehicle dynamics control procedure) executed by a microcomputer employed in the control unit shown in FIG. 4.

Referring now to FIG. 5, there is shown a series of steps S1–S9 for arithmetically calculating basic data (i.e., wheel slip rates $S_{FL}$, $S_{RR}$, $S_{FR}$, $S_{RL}$, the target yaw velocity Yd, the target vehicle slip angle Ad, or the like) which is based on the vehicle sensor's input data and is necessary for the vehicle dynamics control discussed later. When the vehicle dynamics control routine is started during the vehicle running, first, in step S1, the wheel speeds $V_{FL}$, $V_{RR}$, $V_{FR}$ and $V_{RL}$ are calculated on the basis of the wheel speed sensor's input data. In step S2, the yaw velocity Y is calculated on the basis of the yaw-velocity sensor's input data. In step S3, the lateral acceleration G is calculated on the basis of the lateral-acceleration sensor's input data. In step S4, a vehicle speed Vi is calculated or estimated on the basis of the wheel speeds $V_{FL}$, $V_{RR}$, $V_{FR}$ and $V_{RL}$. In step S5, a vehicle slip angle A is calculated on the basis of the calculated yaw velocity Y, the calculated lateral acceleration G, and the calculated vehicle velocity Vi for example in accordance with the following expression (1).

$$A = \int (G/Vi + Y) \tag{1}$$

where the vehicle slip angle A is defined as an angle between a target direction of vehicle motion determined depending on the steering input (the steering wheel angle) and an actual direction of vehicle travel. For example, if the target or intended direction of vehicle motion determined depending on the steering input is almost equal to the actual direction of the vehicle travel during a vehicle turn, the vehicle slip angle A is nearly zero degrees. During turns, the greater slippage of tires, the greater the vehicle slip angle A.

In step S6, slip rates $S_{FL}$, $S_{RR}$, $S_{FR}$ and $S_{RL}$ of the front-left, rear-right, front-right and rear-left road wheels are calculated on the basis of the wheel speeds $V_{FL}$, $V_{RR}$, $V_{FR}$ and $V_{RL}$, and the vehicle speed Vi from the following expressions (2-1, 2—2, 2-3, 2-4).

$$S_{FL} = (V_{FL} - Vi)/Vi \tag{2-1}$$

$$S_{RR} = (V_{RR} - Vi)/Vi \tag{2—2}$$

$$S_{FR} = (V_{FR} - Vi)/Vi \tag{2-3}$$

$$S_{RL} = (V_{RL} - Vi)/Vi \tag{2-4}$$

In step S7, the steering angle D is calculated on the basis of the steering-angle sensor's input data. In step S8, a target yaw velocity Yd is retrieved from a predetermined look-up table on the basis of both the calculated vehicle speed Vi and the calculated steering angle D, and a target vehicle slip angle Ad is retrieved from the other predetermined look-up table on the basis of the data Vi and D. Herein, the target yaw velocity Yd essentially corresponds to the angular velocity about the z-axis which velocity is obtained during a steady-state turn without any understeer or oversteer, that is, when the vehicle is traveling on an ideal locus-of-turn justly based on the steering input. The target yaw velocity Yd varies regularly depending on changes in the vehicle velocity Vi and changes in the steering angle D. Thus, the relationship between the vehicle velocity Vi, the steering angle D, and the target yaw velocity Yd is pre-stored in the computer memory 43A in the form of a predetermined look-up table. Similarly, the vehicle slip angle Ad essentially corresponds to the a vehicle slip angle which is obtained during a steady-state turn without any understeer or oversteer. The target vehicle slip angle Ad varies regularly depending on changes in the vehicle velocity Vi and changes in the steering angle D. Thus, the target vehicle slip angle (Ad) versus vehicle velocity and steering angle characteristic is pre-stored in the computer memory 43A in the form of a predetermined look-up table (or a map data). In step S9, a vehicle dynamics control parameter $K_{FT}$ is calculated on the basis of the yaw velocity Y, the target yaw velocity Yd, the vehicle slip angle A and the target vehicle slip angle Ad, from the following expression (3).

$$K_{FT}=K_1 \cdot (Yd-Y)+K_2 \cdot (Ad-A) \qquad (3)$$

where $K_1$ and $K_2$ are predetermined weighting coefficients.

Figure 6:
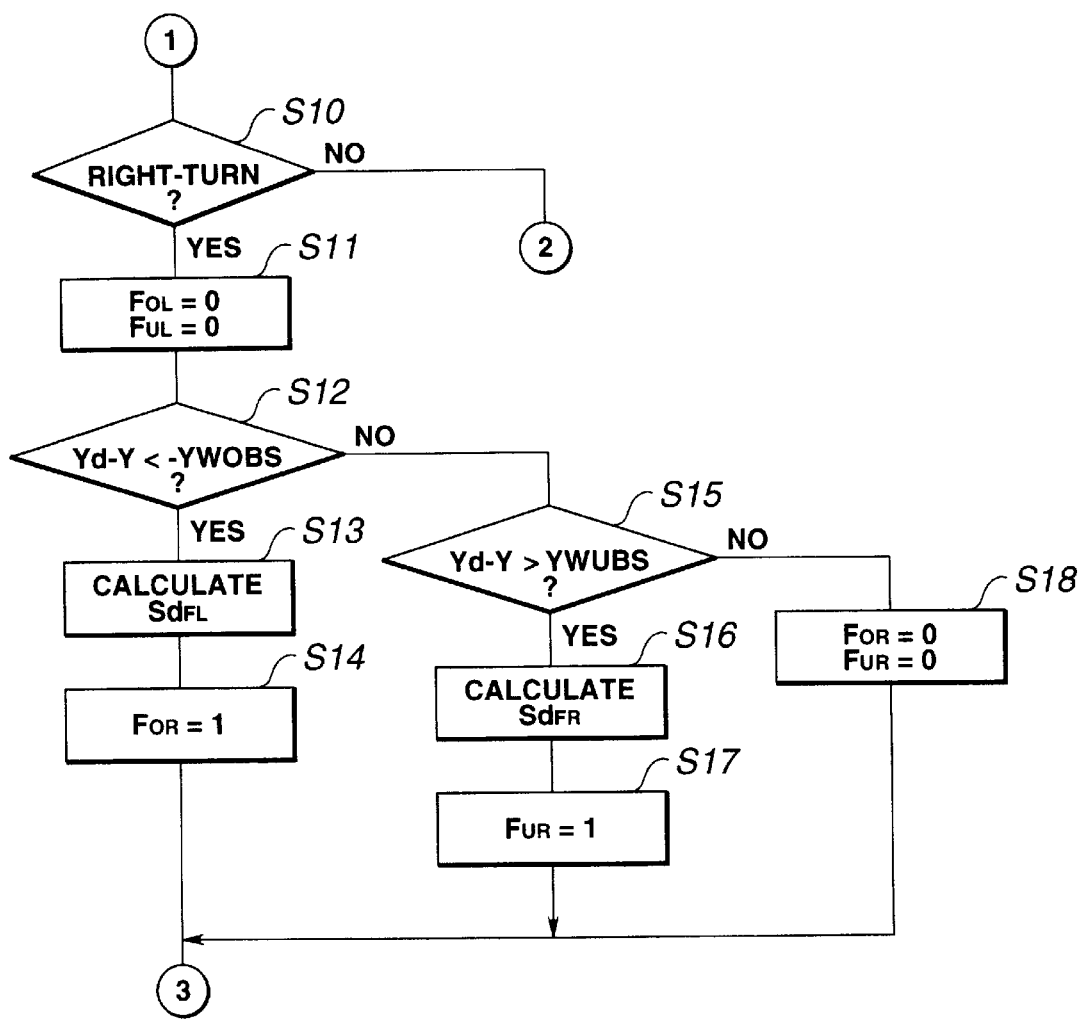
FIG. 6 shows a second series of steps (S10–S18) of the vehicle dynamics control routine following step S9 of FIG. 5.

Thereafter, a series of steps S10–S18 shown in FIG. 6 follow the arithmetic calculations of FIG. 5. Steps of FIG. 6 are provided for deciding whether a right-hand turn is made or a left-hand turn is made, and for deciding whether the vehicle is in a right-turn oversteer or in a right-turn understeer, and for calculating a target front-wheel slip rate Sd (namely a target front-left wheel slip rate $Sd_{FL}$ and a target front-right wheel slip rate $Sd_{FR}$) and for setting or resetting each of vehicle-behavior indicative flags $F_{OL}$, $F_{OR}$, $F_{UL}$ and $F_{UR}$, on the basis of the previously-noted decision results given at an execution cycle of the vehicle dynamics control routine. When the vehicle is in the right-turn oversteer state, only the flag $F_{OR}$ is set at "1". When the vehicle experiences understeer on a right turn, only the flag $F_{UR}$ is set at "1". When the vehicle experiences oversteer on a left turn, only the flag $F_{OL}$ is set at "1". When the vehicle is in the left-turn understeer state, only the flag $F_{UL}$ is set at "1". In step S10 of FIG. 6, a discrimination is made for example on the basis of the yaw velocity Y and the steering angle D as to whether a right-hand turn is made or a left-hand turn is made. The discrimination of step S10 may be made depending on the negative or positive sign of the lateral acceleration G. When step S10 decides that the right turn is made, that is, when the answer to step S10 is in the affirmative (YES), step S11 is entered. In step S11, the vehicle-behavior indicative flags $F_{OL}$ and $F_{UL}$ (the left-turn oversteer indicative flag and the left-turn understeer indicative flag) are both reset to "0". In step S12, a test is made to determine whether the vehicle is in the right-turn oversteer state, on the basis of the following inequality (4).

$$Yd-Y<-YWOBS \qquad (4)$$

That is, in step S12, the yaw velocity Y is regarded as a positive value on a right-hand turn, and a test is made to determine whether the difference (Yd−Y) between the target yaw velocity Yd and the calculated yaw velocity Y is less than a predetermined negative oversteer reference value −YWOBS. The affirmative answer to step S12 means that the vehicle is in the right-turn oversteer state (see FIG. 15). Then, step S13 proceeds in which the target front-left wheel slip rate $Sd_{FL}$ is calculated on the basis of the slip rates $S_{FR}$, $S_{RL}$ and $S_{RR}$ and the vehicle dynamics control parameter $K_{FT}$ calculated at step S9, from the following expression (5).

$$Sd_{FL}=S_{RR}-K_{G1} \cdot S_{RL}+(S_{LIM}/K_{FI}) \cdot K_{FT}+K_{G2} \cdot S_{FR} \qquad (5)$$

where $K_{G1}$ is a predetermined left-and-right car weight-distribution characteristic constant, $K_{G2}$ is a predetermined left-and-right car weight-distribution characteristic constant, $K_{FI}$ is a front-wheel load/inertia characteristic constant, and $S_{LIM}$ is a maximum slip rate which is determined on the assumption that the slip rate and the braking force change linearly to each other. In the previously-noted expression (5), the front-right wheel slip rate $S_{FR}$, the rear-left wheel slip rate $S_{RL}$ and the rear-right wheel slip rate $S_{RR}$ are used for arithmetic calculation of the target front-left wheel slip rate $Sd_{FL}$ necessary to compensating for oversteer tendencies during the right turn. This is because there is a tendency that a skid or slip of each of the front-right, rear-left, and rear-right road wheels exert a great influence on the yawing moment about the z-axis of the vehicle, and thus have a great influence on the target front-left wheel slip rate $Sd_{FL}$ necessary for the vehicle dynamics control during the right-turn oversteer. This may be easily understood, when taking account of the direction-of-action (clockwise or counter-clockwise directions) of each individual braking force acting on the respective tires with respect to the x-axis of the vehicle. That is to say, a slip ($S_{FR}$) of the front-right road wheel and a slip ($S_{RR}$) of the rear-right road wheel act to negate the target front-left wheel slip rate $Sd_{FL}$, because the direction-of-action of yawing moment created by the braking force acting on the front-right tire and the direction-of-action of yawing moment created by the braking force acting on the rear-right tire are both opposite to the direction-of-action of yawing moment created by the braking force acting on the front-left tire. On the contrary, a slip ($S_{RL}$) of the rear-left road wheel acts to assist the target front-left wheel slip rate $Sd_{FL}$, because the direction-of-action of yawing moment created by the braking force acting on the rear-left tire is identical to the direction-of-action of yawing moment created by the braking force acting on the front-left tire. Thus, assuming that the front-left wheel-brake cylinder 1 of the first parallel pair of cylinders 1 and 2 is subjected to the vehicle dynamics control (precisely the vehicle-dynamics regulating brake-fluid pressure control), the rotating or skidding conditions of the front-right wheel-brake cylinder 2 and the second parallel pair, namely the rear-left and rear-right wheel-brake cylinders 3 and 4 may exert a great influence on the yawing moment about the z-axis of the vehicle. For the reasons discussed above, the system of the embodiment utilizes the target front-left wheel slip rate $Sd_{FL}$ given by the expression (5), in order to compensate for the yawing moment acting on the vehicle in the right-turn oversteer state, accounting for the three slip rates $S_{FR}$, $S_{RL}$ and $S_{RR}$. The previously-noted predetermined left-and-right car weight-distribution characteristic coefficients (control gains) $K_{G1}$ and $K_{G2}$ are correction factors which are determined depending on load transfer between left and right road wheels during turns. These coefficients (referred to respectively as "first and second lateral-acceleration dependent correction factors") $K_{G1}$ and $K_{G2}$ are variables. In more detail, the first lateral-acceleration dependent correction factor $K_{G1}$ is a variable which increases essentially in proportion to an increase in the lateral acceleration G detected by the lateral-acceleration sensor 41, whereas the second lateral-acceleration dependent correction factor $K_{G2}$ is a variable which decreases in accordance with an increase in the lateral acceleration G.

Thereafter, in step S14, the vehicle-behavior indicative flag $F_{OR}$ (the right-turn oversteer indicative flag) is set at "1", and the condition of the flag $F_{OR}$ is stored in the computer memory. That is, the condition of $F_{OR}=1$ means that the vehicle is in the right-turn oversteer state.

Returning to step S12, when the answer to step S12 is in the negative (NO), the processor determines that the vehicle is out of the right-turn oversteer state, and then step S15 occurs. In step S15, a test is made to determine whether the vehicle is in the right-turn understeer state, on the basis of the following inequality (6).

$$Yd-Y>YWUBS \qquad (6)$$

That is, in step S15, a test is made to determine whether the difference (Yd–Y) is greater than a predetermined positive understeer reference value YWUBS. The affirmative answer to step S15 means that the vehicle is in the right-turn understeer state (see FIG. 14). Thereafter, step S16 occurs. In step S16, the target front-right wheel slip rate $Sd_{FR}$ is calculated on the basis of the three slip rates $S_{FL}$, $S_{RL}$ and $S_{RR}$ and the vehicle dynamics control parameter $K_{FT}$, from the following expression (7).

$$Sd_{FR}=K_{G1} \cdot S_{RL}-S_{RR}+(S_{LIM}/K_{FI}) \cdot K_{FT}+K_{G2} \cdot S_{FL} \qquad (7)$$

A skid or slip of each of the front-left, rear-left, and rear-right road wheels exert a great influence on the yawing moment about the z-axis of the vehicle, and thus have a great influence on the target front-right wheel slip rate $Sd_{FR}$ necessary for the vehicle dynamics control during the right-turn understeer. That is to say, a slip ($S_{FL}$) of the front-left road wheel and a slip ($S_{RL}$) of the rear-left road wheel act to negate the target front-right wheel slip rate $Sd_{FR}$. On the contrary, a slip ($S_{RR}$) of the rear-right road wheel acts to assist the target front-right wheel slip rate $Sd_{FR}$. Thus, assuming that the front-right wheel-brake cylinder 2 of the first parallel pair of cylinders 1 and 2 is subjected to the vehicle dynamics control, the rotating or skidding conditions of the front-left wheel-brake cylinder 1 and the second parallel pair, namely the rear-left and rear-right wheel-brake cylinders 3 and 4 may exert a great influence on the yawing moment about the z-axis of the vehicle. For the reasons discussed above, the system of the embodiment utilizes the target front-right wheel slip rate $Sd_{FR}$ given by the expression (7), in order to compensate for the yawing moment acting on the vehicle in the right-turn understeer state, accounting for the three slip rates $S_{FL}$, $S_{RL}$ and $S_{RR}$.

Then, in step S17, the vehicle-behavior indicative flag $F_{UR}$ (the right-turn understeer indicative flag) is set at "1", and the condition of the flag $F_{UR}$ is stored in the computer memory. Returning to step S15, when the answer to step S15 is negative (NO), step S18 is entered. In step S18, the vehicle-behavior indicative flags $F_{OR}$ and $F_{UR}$ are both reset to "0".

Figure 7:
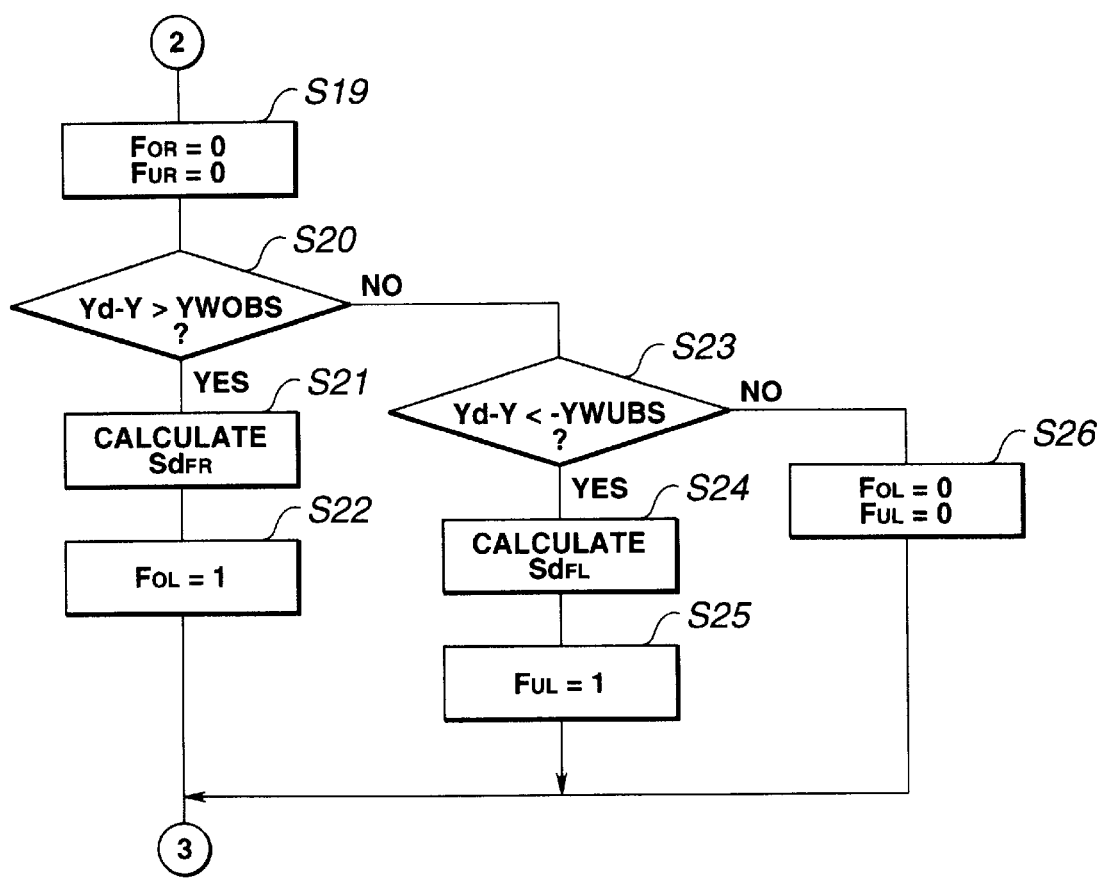
FIG. 7 shows a third series of steps (S19–S26) of the vehicle dynamics control routine following step S10 of FIG. 6.

Returning again to step S10, when the answer to step S10 is in the negative (NO), that is when the computer determines that the vehicle is in the left-turn state, a series of steps S19–S26 shown in FIG. 7 follow. Steps of FIG. 7 are provided for deciding whether the vehicle is in a left-turn oversteer or in a left-turn understeer, and for calculating a target front-left wheel slip rate $Sd_{FL}$ and a target front-right wheel slip rate $Sd_{FR}$ and for setting or resetting each of vehicle-behavior indicative flags $F_{OL}$, $F_{OR}$, $F_{UL}$ and $F_{UR}$, on the basis of the previously-noted decision results given at an execution cycle of the vehicle dynamics control routine. When step S10 determines that the right-hand turn is not made, the right-turn oversteer indicative flag $F_{OR}$ and the right-turn understeer indicative flag $F_{UR}$ are both reset to "0" at step S19. Thereafter, step S20 is entered. In step S20, a test is made to determine whether the vehicle is in the left-turn oversteer state, on the basis of the following inequality (8).

$$Yd-Y>YWOBS \qquad (8)$$

That is, in step S20, a test is made to determine whether the difference (Yd–Y) is greater than a predetermined positive oversteer reference value YWOBS. The affirmative answer to step S20 means that the vehicle is in the left-turn oversteer state (see FIG. 13), and thus step S21 occurs. In step S21, the target front-right wheel slip rate $Sd_{FR}$ is calculated on the basis of the three slip rates $S_{FL}$, $S_{RL}$ and $S_{RR}$ and the vehicle dynamics control parameter $K_{FT}$, from the following expression (9). Note that the expression (9) used in the left-turn oversteer state is similar to, but slightly different from the expression (7) used in the right-turn understeer state in that the lateral load transfer dependent correction factor $K_{G1}$ is added to the rear-right wheel slip rate $S_{RR}$.

$$Sd_{FR}=S_{RL}-K_{G1} \cdot S_{RR}+(S_{LIM}/K_{FI}) \cdot K_{FT}+K_{G2} \cdot S_{FL} \qquad (9)$$

Thereafter, step S22 is entered in which the left-turn oversteer indicative flag $F_{OL}$ is set at "1" to temporarily store that the vehicle is in the left-turn oversteer state. Conversely, when the answer to step S20 is in the negative (No), step S23 occurs. In step S23, a test is made to determine whether the vehicle is in the left-turn understeer state, on the basis of the following inequality (10).

$$Yd-Y<-YWUBS \qquad (10)$$

That is, in step S23, a test is made to determine whether the difference (Yd–Y) is less than a predetermined negative understeer reference value –YWUBS. The affirmative answer to step S23 means that the vehicle is in the left-turn understeer state (see FIG. 12). Thereafter, step S24 occurs. In step S24, the target front-left wheel slip rate $Sd_{FL}$ is calculated on the basis of the three slip rates $S_{FR}$, $S_{RL}$ and $S_{RR}$ and the vehicle dynamics control parameter $K_{FT}$, from the following expression (11). Note that the expression (11) used in the left-turn understeer state is similar to, but slightly different from the expression (5) used in the right-turn oversteer state in that the lateral load transfer dependent correction factor $K_{G1}$ is added to the rear-right wheel slip rate $S_{RR}$.

$$Sd_{FL}=K_{G1} \cdot S_{RR}-S_{RL}+(S_{LIM}/K_{FI}) \cdot K_{FT}+K_{G2} \cdot S_{FR} \qquad (11)$$

After step S24, step S25 follows. In step S25, the left-turn understeer indicative flag $F_{UL}$ is set at "1" and at the same time the condition of $F_{UL}=1$ is temporarily stored in the computer RAM memory. Returning to step S23, when the answer to step S23 is negative (NO), step S26 occurs. In step S26, the left-turn oversteer indicative flag $F_{OL}$ and the left-turn understeer indicative flag $F_{UL}$ are both reset to "0".

Figure 8:
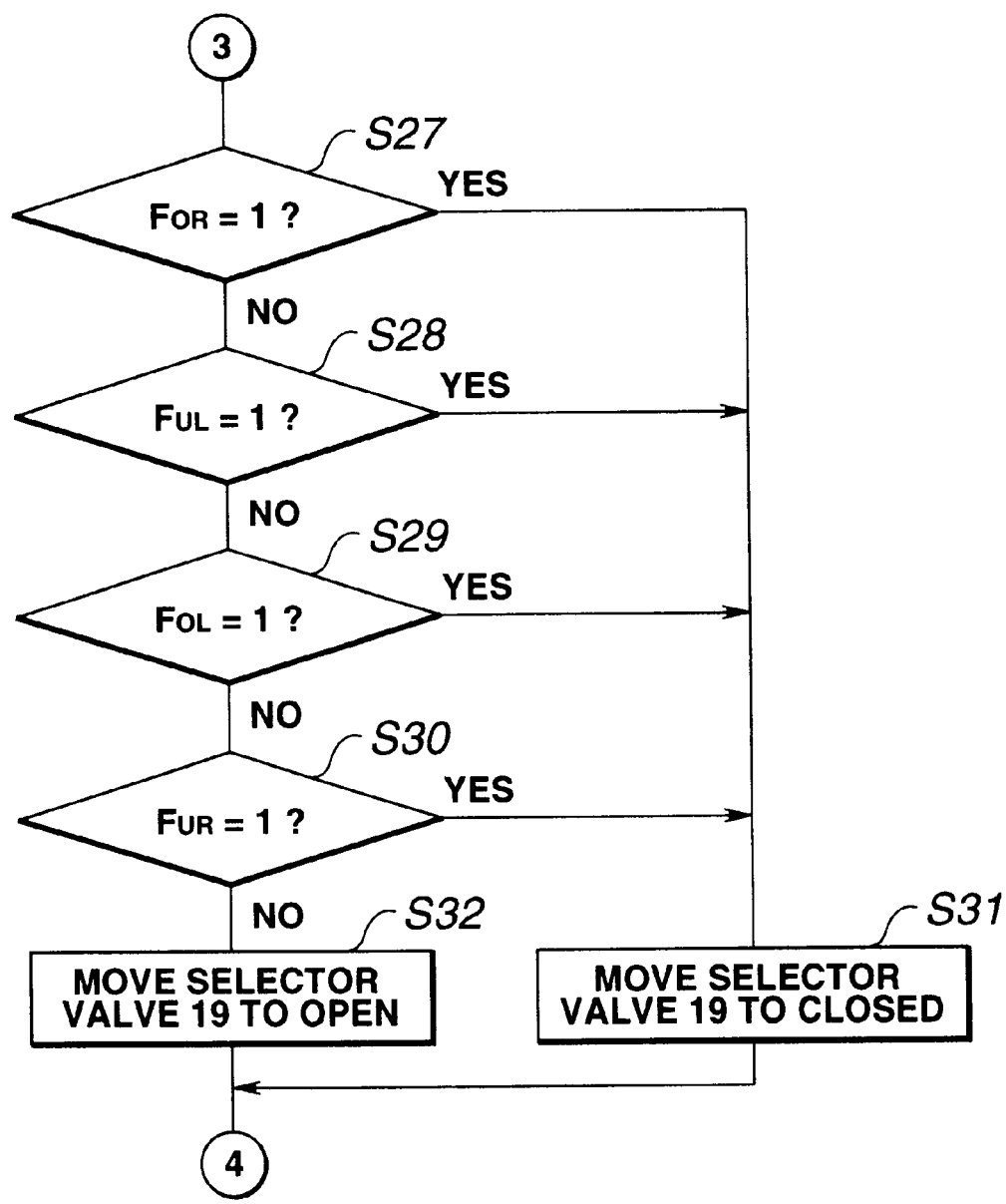
FIG. 8 shows a fourth series of steps (S27–S32) of the vehicle dynamics control routine following either steps S14, S17 or S18 of FIG. 6, or steps S22, S25 or S26 of FIG. 7.

After completion of setting or resetting the each of the vehicle-behavior indicative flags $F_{OR}$, $F_{UR}$, $F_{OL}$, and $F_{UL}$, that is, after steps S14, S17 or S18 in FIG. 6, or after steps S22, S25 or S26 in FIG. 7, step S27 of FIG. 8 occurs. A series of steps S27–S32 of FIG. 8 are provided for properly driving or controlling the fluid-pressure selector valve 19, in response to the state conditions of the four vehicle-behavior indicative flags $F_{OR}$, $F_{UR}$, $F_{OL}$, and $F_{UL}$, and consequently for selecting a required fluid pressure to be directed to the first brake line 5 from between the brake-fluid pressure output from the primary master-cylinder outlet port and the brake-fluid pressure output from the control pump 13. In steps S27, S28, S29 and S30 of FIG. 8, when either one of the vehicle-behavior indicative flags $F_{OR}$, $F_{UL}$, $F_{OL}$, or $F_{UR}$ is set at "1", step S31 occurs. Conversely when all of the four vehicle-behavior indicative flags are reset at "0", step S32 occurs. In step S31, the fluid-pressure selector valve 19 is moved to its shut-off position. This inhibits the master-cylinder pressure from being directed from the primary master-cylinder outlet port to the first brake line 5, and permits the pumped and regulated fluid pressure to be directed from the control pump 13 to the first brake line 5. In step S32, the fluid-pressure selector valve 19 is moved to its full fluid-communication position. This permits the master-cylinder pressure from being directed to the first brake line 5. When the vehicle is in the right-turn oversteer state, in the left-turn understeer state, in the left-turn oversteer state or in the right-turn understeer state (see the flow from either one of steps S27, S28, S29 or S30 to step S31), the control unit permits the fluid pressure output from the pump 13 to be fed into the first brake line 5. Therefore, the brake-fluid pressures in the front-left and front-right wheel-brake cylinders 1 and 2, both connected to the first brake line 5, are controlled or regulated by means of the control pump 13 and the fluid-pressure control valves 20 through 23. That is, the fluid pressure within front-left wheel-brake cylinder 1 is properly regulated by way of the fluid-pressure control valves 20 and 22 associated with the wheel cylinder 1. Also, the fluid pressure within front-right wheel-brake cylinder 2 is properly regulated by way of the fluid-pressure control valves 21 and 23 associated with the wheel cylinder 2. On the contrary, when the vehicle is neither in the right-turn oversteer state, in the left-turn understeer state, in the left-turn oversteer state nor in the right-turn understeer state, that is, in case of $F_{OR}=0$, $F_{UL}=0$, $F_{OL}=0$ and $F_{UR}=0$, the fluid-pressure selector valve 19 is maintained at its full fluid-communication position shown in FIG. 3. This permits the master-cylinder pressure to be directed from the primary master-cylinder outlet port to the first brake line 5 connected to the first parallel pair of wheel-brake cylinders 1 and 2, and thus the fluid pressures within the wheel cylinders 1 and 2 vary in response to the magnitude of brake-pedal depression. On the other hand, the fluid-pressure selector valve 31, disposed between the secondary master-cylinder outlet port and the second brake line 6, is usually maintained at its full fluid-communication position regardless of the vehicle dynamics control routine. The fluid-pressure selector valve 31 can be operated according to the ABS control. Thus, when the anti-lock brake system is in its inoperative state, the valve 31 is maintained fully opened, thus usually (in the ABS inoperative state) permitting the master-cylinder pressure via the second brake line to the rear-left and rear-right wheel-brake cylinders 3 and 4. Therefore, the fluid pressures within the rear wheel-brake cylinder 3 and 4 can be controlled or regulated in response to the foot-pedal's depression, except during the ABS control.

Figure 9:
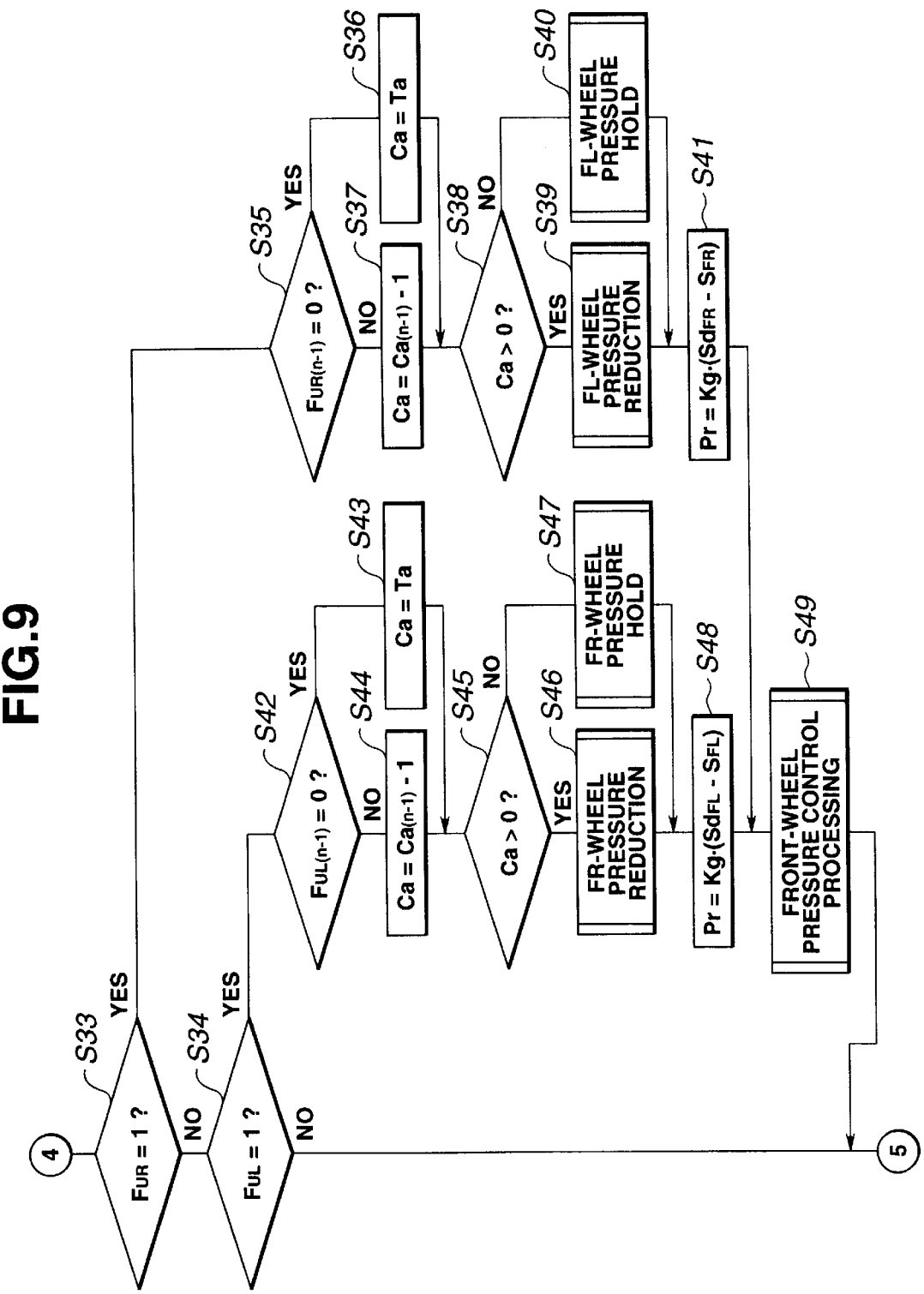
FIG. 9 shows a fifth series of steps (S34–S49) of the vehicle dynamics control routine following either steps S31 or S32 of FIG. 8.

Subsequently to steps S31 and S32 of FIG. 8, a series of steps S33–S49 of FIG. 9 follow. Steps S33–S49 of FIG. 9 are provided for reducing the fluid pressure within the outer front wheel-brake cylinder down to the minimum value to compensate for undesired left-turn understeer or right-turn understeer (see FIGS. 12 and 14), and for properly regulating the fluid pressure within the inner front wheel-brake cylinder by adjusting the pressure level of brake fluid delivered from the pump 13 to the brake line 5 by the two fluid-pressure control valves associated with the inner front wheel-brake cylinder (corresponding to the valves 20 and 22 in case of $F_{UL}=1$, and corresponding to the valves 21 and 23 in case of $F_{UR}=1$). The flow chart shown in FIG. 9 is hereinbelow described in detail.

In step S33, a test is made to determine whether the right-turn understeer indicative flag $F_{UR}$ is set at "1". When the answer to step S33 is affirmative (YES), step 35 occurs. In step S35, a test is made to determine whether the previous value $F_{UR(n-1)}$ of the right-turn understeer indicative flag is reset to "0". When the current value $F_{UR(n)}$ (simply $F_{UR}$) of the right-turn understeer indicative flag is set and the previous value $F_{UR(n-1)}$ is reset, i.e., in case of $F_{UR(N)}=1$ and $F_{UR(n-1)}=0$, the CPU of the computer determines that the vehicle's cornering behavior begins to shift to the right-turn understeer state at the current cycle of the vehicle dynamics control program. Then, step S36 is entered in which the "count" value of the pressure-reduction counter Ca is set at a predetermined pressure-reduction time duration Ta. Thereafter, step S38 occurs. When the answer to step S35 is negative, step S37 occurs. When the current value $F_{UR}$ of the right-turn understeer indicative flag is set and the previous value $F_{UR(n-1)}$ is also set, i.e., in case of $F_{UR(n)}=1$ and $F_{UR(n-1)}=1$, the CPU determines that the vehicle's cornering behavior is maintained in the right-turn understeer state at between the previous and current execution cycles. In step S37, the previous "count" value $Ca_{(n-1)}$ of the pressure-reduction counter is decremented by "1", and the current "count" value $Ca_{(n)}$ (simply Ca) is updated by the decremented "count" value $Ca_{(n-1)}$–1. Then, step S38 proceeds. In step S38, a test is made to determine whether the current "count" value Ca is greater than "0". In case of Ca>0, step S39 is entered. In step S39, the control unit operates to reduce the fluid pressure in the front-left wheel-brake cylinder 1 (the outer front wheel-brake cylinder). That is, in the right-turn understeer state, the control unit shifts the fluid-pressure selector valve 19 and the fluid-pressure control valve 20 to the shut-off positions and then shifts the fluid-pressure control valve 22 to the full fluid-communication position, thereby permitting the flow of brake fluid in the wheel cylinder 1 into the primary reservoir 16. This reduces the fluid pressure in the wheel cylinder 1. When the answer to step S38 is negative (NO), i.e., in case of Ca≦0, step S40 is entered. In this manner, when the condition of Ca≦0 is satisfied, the CPU determines that the predetermined pressure-reduction time duration Ta has been elapsed after setting the "count" value Ca at the predetermined value Ta. Thus, in step S40, the control unit operates to hold the fluid pressure in the front-left wheel-brake cylinder 1 (the outer front wheel-brake cylinder). That is, as soon as the predetermined pressure-reduction time duration Ta has been elapsed, the control unit shifts the fluid-pressure control valve 22 again to the shut-off position, while holding the fluid-pressure control valve 20 at the shut-off position. As a result, the fluid pressure in the wheel cylinder 1 is held at the minimum fluid pressure level (for example zero). In other words, the braking force acting on the outer front wheel (the front-left road wheel) is held at the minimum value. Thereafter, step S41 occurs. In step S41, a required controlled-pressure value Pr for the front-right wheel-brake cylinder 2 (the inner front wheel-brake cylinder) is calculated from the following expression (12), by multiplication of the difference $(Sd_{FR}-S_{FR})$ with a predetermined control gain Kg.

$$Pr=Kg\cdot(Sd_{FR}-S_{FR}) \quad (12)$$

where $Sd_{FR}$ is the target front-right wheel slip rate (see step S16 of FIG. 6) and $S_{FR}$ is the calculated front-right wheel slip rate (see step S6 of FIG. 5).

Returning to step S33, when the answer to step S33 is negative (NO), step S34 occurs. In step S34, a test is made to determine whether the left-turn understeer indicative flag $F_{UL}$ is set at "1". When the left-turn understeer indicative flag $F_{UL}$ is set at "1", the procedure flows from step S34 to step S42. Steps S42–S47 related to the front-right wheel-brake cylinder pressure control (the outer front wheel-brake cylinder pressure control) are similar to the previously-noted steps S35–S40 related to the front-left wheel-brake cylinder pressure control. That is, the brake-fluid pressure in the front-right wheel-brake cylinder 2 is reduced until the preset pressure-reduction time interval Ta has been elapsed, and then the front-right wheel cylinder pressure is kept at the minimum fluid pressure level (for example zero). Thereafter, step S48 is entered. In step S48, a required controlled-pressure value Pr for the front-left wheel-brake cylinder 1 is calculated from the following expression (13), by multiplication of the difference ($Sd_{FL}-S_{FL}$) with the predetermined control gain Kg.

$$Pr=Kg \cdot (Sd_{FL}-S_{FL}) \qquad (13)$$

where $Sd_{FL}$ is the target front-left wheel slip rate (see step S13 of FIG. 6) and $S_{FL}$ is the calculated front-left wheel slip rate (see step S6 of FIG. 5).

Figure 10:
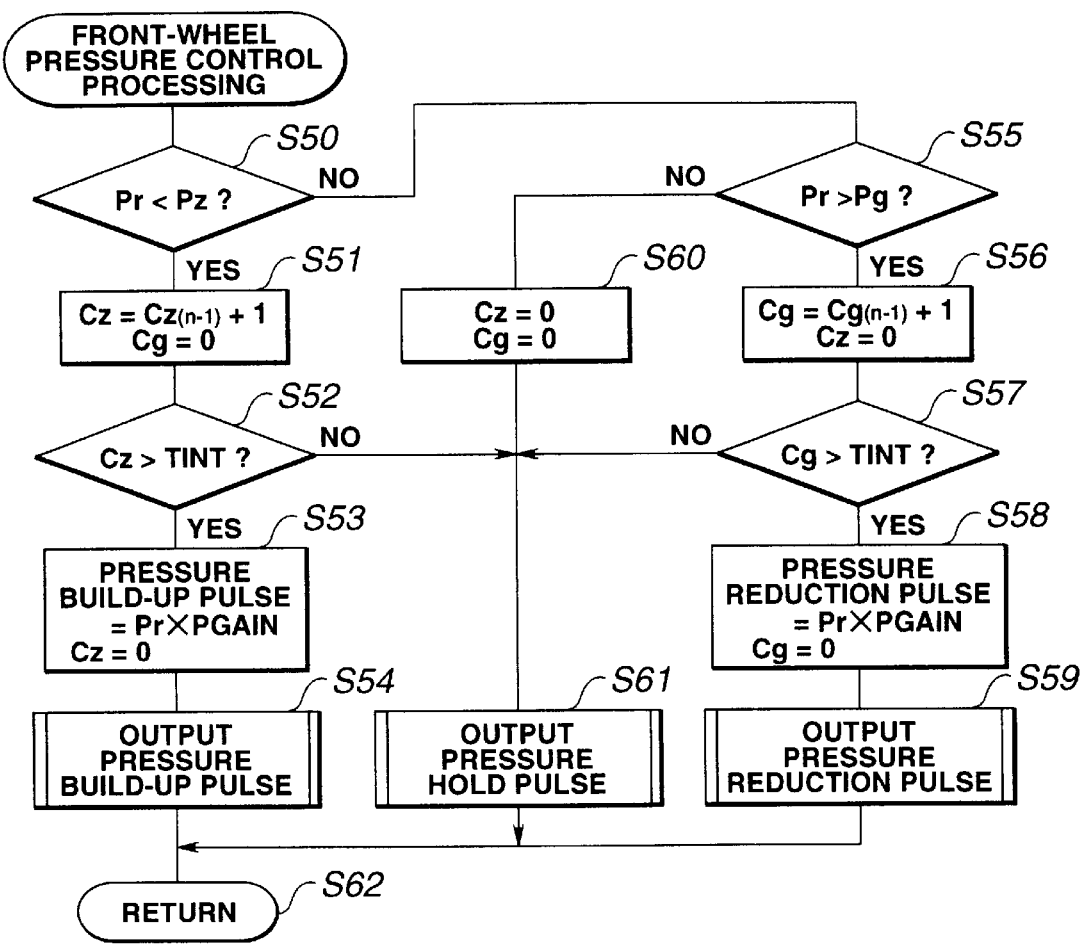
FIG. 10 shows a pre-defined sub-routine executed in step S49 of FIG. 9 or in step S79 of FIG. 11.

After steps S41 or S48, step S49 occurs. In step S49, a front-wheel pressure control processing is executed in accordance with the flow chart shown in FIG. 10. In the front-wheel pressure control processing of FIG. 10, when the control unit determines that the vehicle is in the right-turn understeer state, the fluid-pressure control valves 21 and 23 both associated with the front-right wheel-brake cylinder 2, and the fluid-pressure control pump 13 are all controlled or driven in response to the pressure build-up pulse signal (see steps S53 and S54), the pressure hold pulse signal (see steps S61), or the pressure reduction pulse signal (see step S58 and S59). During the right-turn understeer, as appreciated from steps S53 and S58 of FIG. 10, the pressure build-up pulse signal and the pressure reduction pulse signal are calculated on the basis of the required controlled-pressure value Pr for the front-right wheel-brake cylinder 2. Alternatively, while the pressure hold pulse signal (see step S61 of FIG. 10) is output to the fluid-pressure control valves 21 and 23 during the right-turn understeer, the two valves 21 and 23 remain fully closed to hold the front-right wheel cylinder pressure at a constant value. On the other hand, when the control unit determines that the vehicle is in the left-turn understeer state, the fluid-pressure control valves 20 and 22 both associated with the front-left wheel-brake cylinder 1, and the fluid-pressure control pump 13 are all controlled or driven in response to the pressure build-up pulse signal (see steps S53 and S54), the pressure hold pulse signal (see steps S61), or the pressure reduction pulse signal (see step S58 and S59). During the left-turn understeer, as appreciated from steps S53 and S58 of FIG. 10, the pressure build-up pulse signal and the pressure reduction signal are calculated on the basis of the required controlled-pressure value Pr for the front-left wheel-brake cylinder 1. Alternatively, while the pressure hold pulse signal (see step S61 of FIG. 10) is output to the fluid-pressure control valves 20 and 22 during the left-turn understeer, the two valves 20 and 22 remain fully closed to hold the front-left wheel cylinder pressure at a constant value. Details of steps S50–S62 shown in FIG. 10 are hereinbelow exemplified or explained only in the left-turn understeer state condition, for the purpose of simplification of the disclosure.

In step S50, a test is made to determine whether the required controlled-pressure value Pr for the front-left wheel-brake cylinder 1 is less than a predetermined pressure build-up threshold value Pz. The required controlled-pressure value Pr less than the predetermined pressure build-up threshold value Pz means that the front-left wheel slip rate $S_{FL}$ does not yet reach the target front-left wheel slip rate $Sd_{FL}$, and thus it is necessary to build-up the fluid pressure in the front-left wheel-brake cylinder 1. Thus, when the answer to step S50 is affirmative (YES), i.e., in case of Pr<Pz, the procedure flows via step S51 to step S52. In step S51, the pressure build-up counter Cz is incremented by "1", while the pressure-reduction counter Cg is reset at "0". In step S52, a test is made to determine whether the "count" value of the pressure build-up counter Cz is greater than the predetermined time interval TINT such as 30 msec. In case of Cz>TINT, steps S53 and S54 follow to execute a fluid-pressure build-up processing for the front-left wheel-brake cylinder 1. The previously-noted comparison step S52 between the pressure build-up counter value Cz and the predetermined time interval TINT is provided for cyclically operating the front-left wheel-brake cylinder at its pressure build-up mode every predetermined time intervals TINT. This is because, usually, the rotational speed of the front-left road wheel does not change at the same time when the pressure build-up control or the pressure-reduction control for the front-left wheel-brake cylinder 1 is started, and thus there is a slight time delay between an actual change in the front-left wheel speed and the beginning of the pressure build-up or pressure-reduction control for the front-left wheel-brake cylinder 1. Therefore, the control unit must determine the next proper control mode from among the pressure build-up, pressure-reduction and pressure-hold modes, while monitoring changes (decrease or increase) in the front-left wheel speed based on the pressure build-up or pressure-reduction controls. In step S53, a pressure build-up pulse signal value is determined by multiplication of the required controlled-pressure value Pr for the front-left wheel-brake cylinder 1 with a predetermined pulse conversion coefficient PGAIN from the following expression (14).

$$\text{Pressure build-up pulse}=Pr \cdot \text{PGAIN} \qquad (14)$$

At the same time, in step S53, the pressure build-up counter value Cz is reset at "0".

Thereafter, step S54 is entered in which control signals based on the pressure build-up pulse signal value are output to the solenoids of the fluid-pressure control valves 20 and 22, and the electric motor of the pump 13. In more detail, in the presence of the output of the pressure build-up pulse during the left-turn understeer (i.e., $F_{UL}$=1), the system permits the fluid-pressure supply from the pump 13 to the first brake line 5 with the fluid-pressure selector valve 19 and the fluid-pressure control valve 22 kept closed. At the same time, in response to the pressure build-up pulse, the fluid-pressure control valve 20 is switched to the fluid-communication position, and then the pump 13 is driven. As a result, the pressurized brake fluid generated by the pump 13 is delivered via the valve 20 to the front-left wheel-brake cylinder 1 and the front-left wheel cylinder pressure is built up, thereby increasing the braking force of the front-left road wheel.

On the contrary, when the answer to step S50 is negative (NO), in case of Pr≧Pz, step S55 occurs. In step S55, a test is made to determine whether the required controlled-fluid pressure for the front-left wheel-brake cylinder 1 is greater than a predetermined pressure-reduction threshold value Pg. The required controlled-pressure value Pr greater than the predetermined pressure-reduction threshold value Pg means that the front-left wheel slip rate $S_{FL}$ exceeds the target front-left wheel slip rate $Sd_{FL}$, and thus it is necessary to reduce the fluid pressure in the front-left wheel-brake cylinder 1. Thus, when the answer to step S55 is affirmative (YES), i.e., in case of Pr>Pg, the procedure flows via step S55 to step S56. In step S56, the pressure-reduction counter Cg is incremented by "1", while the pressure build-up counter Cz is reset at "0". In step S57, a test is made to determine whether the "count" value of the pressure-reduction counter Cz is greater than the predetermined time interval TINT. In case of Cg>TINT, steps S58 and S59 follow to execute a fluid-pressure reduction processing for the front-left wheel-brake cylinder 1. The previously-noted comparison step S57 between the pressure-reduction counter value Cg and the predetermined time interval TINT is provided for cyclically operating the front-left wheel-brake cylinder at its pressure-reduction mode every predetermined time intervals TINT. The control unit determines the next proper control mode from among the pressure build-up, pressure-reduction and pressure-hold modes, while monitoring changes (decrease or increase) in the front-left wheel speed based on the pressure-change control. In step S58, a pressure-reduction pulse signal value is determined by multiplication of the required controlled-pressure value Pr for the front-left wheel-brake cylinder 1 with a predetermined pulse conversion coefficient PGAIN from the following expression (15).

Pressure-reduction pulse=$Pr$·PGAIN  (15)

At the same time, in step S58, the pressure-reduction counter value Cg is reset at "0".

Thereafter, step S59 is entered in which control signals based on the pressure-reduction pulse signal value are output to the solenoids of the fluid-pressure control valves 20 and 22, and the electric motor of the pump 13. In more detail, in the presence of output the pressure-reduction pulse, the pump 13 is stopped, and then the fluid-pressure control valve 20 is switched to the shut-off position and the fluid-pressure control valve 22 is switched to the fluid-communication position. As a result, the brake fluid within the front-left wheel-brake cylinder 1 is directed via the valve 22 toward the primary reservoir 16 and thus the front-left wheel cylinder pressure is reduced, thereby decreasing the braking force of the front-left road wheel.

Returning to step S55, when the answer to step S55 is negative (NO), i.e., in case of Pr≦Pg, steps S60 and S61 follow to hold the fluid pressure in the front-left wheel-brake cylinder 1 constant. Instep S60, pressure build-up counter value Cz and the pressure-reduction counter value Cg are both reset at "0". Thereafter, step S61 is entered. Also, when the answer to steps S52 or S57 is negative, step S61 occurs. In step S61, the control unit outputs control signals based on a predetermined pressure-hold pulse signal value to switch the two valves 20 and 22 associated with the front-left wheel cylinder 1 to their shut-off positions. The output of control signals based on the predetermined pressure-hold maintains the fluid pressure in the front-left wheel cylinder 1 at the current pressure level. After steps S54, S59 or S61, step S62 occurs in which the procedure returns from the front-wheel pressure control sub-routine to the main program (the background routine for the vehicle dynamics control). As can be appreciated from the front-wheel pressure control processing (steps S50–S62) shown in FIG. 10, when the vehicle is in the left-turn understeer state, the fluid pressure in the wheel-brake cylinder corresponding to the inner front road wheel (that is, the front-left wheel-brake cylinder pressure) is properly increased in response to the required controlled-pressure value Pr, with the result that the braking force of the inner front road wheel is increased.

As previously discussed by reference to the expression (13) ($Pr=Kg·(Sd_{FL}-S_{FL})$), the required controlled-pressure value Pr is given by multiplication of the difference between the target front-left wheel slip rate $Sd_{FL}$ and the calculated front-wheel slip rate $S_{FL}$ with the predetermined control gain Kg. As may be appreciated, the greater the degree of the left-turn understeer, the greater the difference ($Sd_{FL}-S_{FL}$), thus increasing the required controlled-pressure value Pr. As soon as the understeer tendency increases and thus the deviation from the target slip rate $Sd_{FL}$ exceeds the predetermined pressure build-up threshold value Pz, the inner front wheel cylinder pressure, which corresponds to the front-left wheel-brake cylinder pressure during the left-turn understeer, is suitably increased by way of the flow from step S50, through steps S51–S53 to step S54, depending on the degree of understeer on the left turn. As a result, the braking force of the front-left wheel is increased depending on the degree of understeer during the left turn. This effectively compensates for the yawing moment acting on the vehicle during the left-turn understeer state, and regulates the vehicle's cornering behavior toward neutral steer. Additionally, in the left-turn understeer state, the front-left wheel-brake cylinder 1 is cyclically operated at either one of the three modes, namely the pressure build-up mode, the pressure-reduction mode, or the pressure-hold mode, every predetermined time intervals TINT, while monitoring a change in the front-left wheel cylinder pressure. Therefore, the braking force of the front-left road wheel (or the front-left wheel-brake cylinder pressure) can be suitably increased to such an extent that the left-turn understeer state is avoided. The cyclic selection of the pressure control mode prevents generation of excessive fluid pressure in the front-left wheel-brake cylinder 1.

Figure 11:
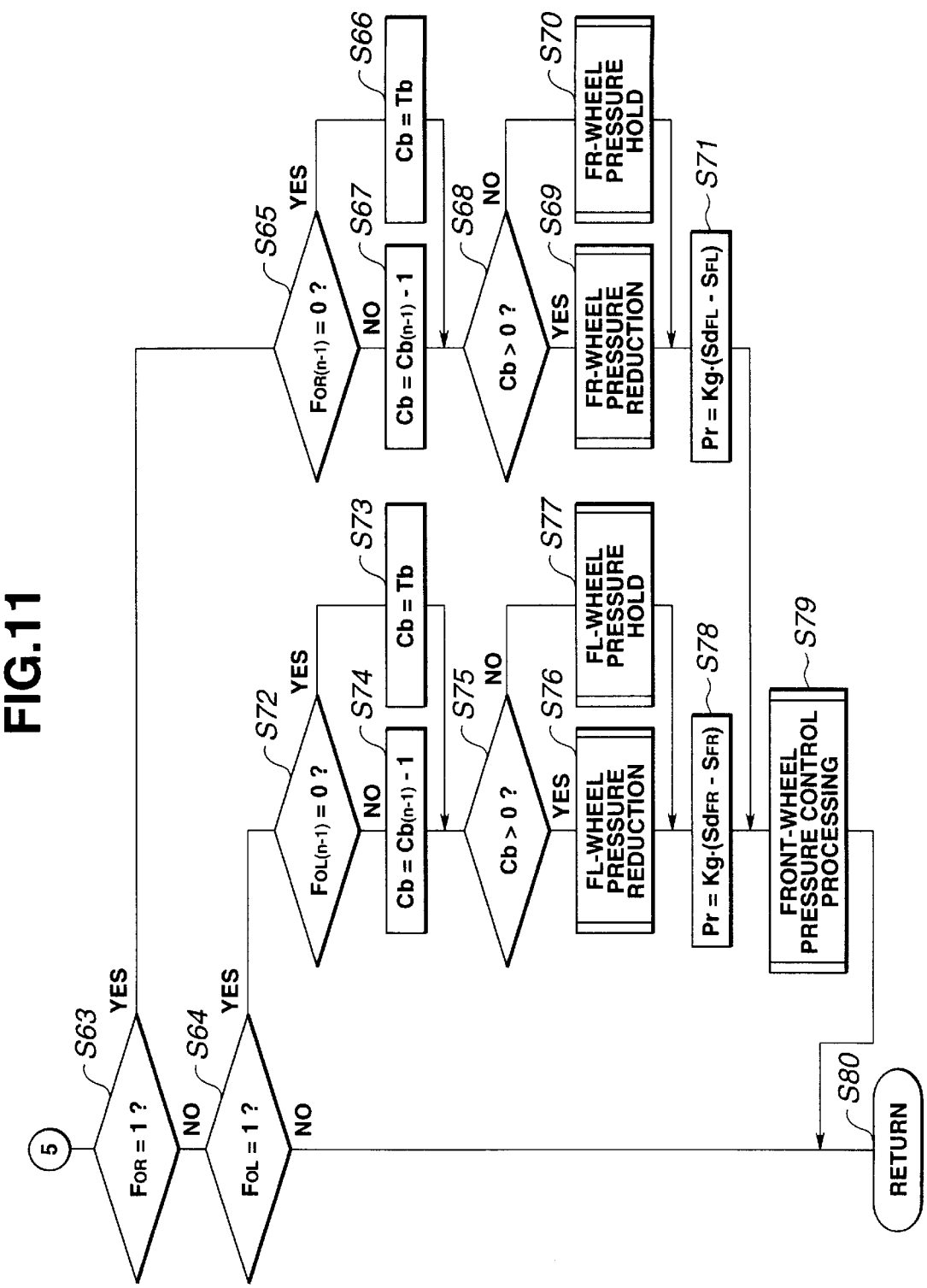
FIG. 11 shows a sixth series of steps (S63–S80) of the vehicle dynamics control routine following either steps S34 or S49 of FIG. 9.

Subsequently to step S49 of FIG. 9, a series of steps S63–S80 of FIG. 11 follow. Steps S63–S80 of FIG. 11 are provided for reducing the fluid pressure within the inner front wheel-brake cylinder down to the minimum value to compensate for undesired left-turn oversteer or right-turn oversteer (see FIGS. 13 and 15), and for properly regulating the fluid pressure within the outer front wheel-brake cylinder by adjusting the pressure level of brake fluid delivered from the pump 13 to the brake line 5 by the two fluid-pressure control valves associated with the outer front wheel-brake cylinder (corresponding to the valves 21 and 23 in case of $F_{OL}=1$, and corresponding to the valves 20 and 22 in case of $F_{OR}=1$). The flow chart shown in FIG. 11 is hereinbelow described in detail.

In step S63, a test is made to determine whether the right-turn oversteer indicative flag $F_{OR}$ is set at "1". When the answer to step S63 is affirmative, step S65 is entered. Steps S65–S70 (i.e., the pressure-reduction and pressure-hold control for the inner front road wheel in the right-turn oversteer state) are similar to the previously-discussed steps S35–S40 (i.e., the pressure-reduction and pressure-hold control for the outer front road wheel in the right-turn understeer state) shown in FIG. 9, and thus detailed description of steps S65 through S70 will be omitted because the above description thereon seems to be self-explanatory. Briefly, through steps S65–S70, the control unit continues to reduce the fluid pressure in the inner front wheel cylinder (the front-right wheel-brake cylinder 2) until a predetermined pressure-reduction time duration Tb has been elapsed, while measuring an elapsed time from the beginning of the pressure-reduction control mode by way of the pressure-reduction counter (Cb). As soon as the predetermined pressure-reduction time duration Tb has been elapsed, the control unit operates to shift the fluid-pressure control valve 23 again to the shut-off position, while holding the fluid-pressure control valve 21 at the shut-off position, so as to hold the fluid pressure in the wheel cylinder 2 at the minimum pressure level (for example zero). After steps S69 or S70, step S71 occurs. In step S71, a required controlled-pressure value Pr for the front-left wheel-brake cylinder 1 is calculated from the following expression (16), by multiplication of the difference ($Sd_{FL}-S_{FL}$) with a predetermined control gain Kg.

$$Pr=Kg\cdot(Sd_{FL}-S_{FL}) \tag{16}$$

Returning to step S63, when the answer to step S63 is negative, step S64 occurs. Instep S64, atest is made to determine whether the left-turn oversteer indicative flag $F_{OL}$ is set at "1". When the left-turn oversteer indicative flag $F_{OL}$ is set at "1", the procedure flows from step S64 to step S72. Steps S72–S77 related to the front-left wheel-brake cylinder pressure control (the inner front wheel-brake cylinder pressure control) are similar to the previously-noted steps S65–S70 related to the front-right wheel-brake cylinder pressure control. That is, the brake-fluid pressure in the front-left wheel-brake cylinder 1 is reduced until the preset pressure-reduction time interval Tb has been elapsed, and then the front-left wheel cylinder pressure is kept at the minimum fluid pressure level (for example zero). Thereafter, step S78 is entered. In step S78, a required controlled-pressure value Pr for the front-right wheel-brake cylinder 2 is calculated from the following expression (17), by multiplication of the difference ($Sd_{FR}-S_{FR}$) with the predetermined control gain Kg.

$$Pr=Kg\cdot(Sd_{FR}-S_{FR}) \tag{17}$$

After steps S71 or S78, step S79 occurs. In step S79, the previously-discussed front-wheel pressure control processing is executed in accordance with the flow chart shown in FIG. 10. That is to say, when the control unit determines that the vehicle is in the right-turn oversteer state (see FIG. 15), the fluid-pressure control valves 20 an 22 both associated with the front-left wheel-brake cylinder 1, and the pump 13 are all controlled or driven in response to the pressure build-up pulse signal, the pressure hold pulse signal, or the pressure reduction pulse signal, each of which is based on the required controlled-pressure value Pr (calculated at step S71) for the front-left wheel-brake cylinder 1. Therefore, the outer front wheel cylinder is cyclically operated at either the pressure build-up mode, the pressure reduction mode or the pressure hold mode, every predetermined time intervals TINT such as 30 msec, in order to properly increase the fluid pressure in the outer front wheel cylinder (the front-left wheel-brake cylinder pressure). On the contrary, when the control unit determines that the vehicle is in the left-turn oversteer state, the fluid-pressure control valves 21 an 23 both associated with the front-right wheel-brake cylinder 2, and the pump 13 are all controlled or driven in response to the pressure build-up pulse signal, the pressure hold pulse signal, or the pressure reduction pulse signal, each of which is based on the required controlled-pressure value Pr (calculated at step S78) for the front-right wheel-brake cylinder 2. Therefore, the outer front wheel cylinder is cyclically operated at either the pressure build-up mode, the pressure reduction mode or the pressure hold mode, every predetermined time intervals TINT such as 30 msec, in order to properly increase the fluid pressure in the outer front wheel cylinder (the front-right wheel-brake cylinder pressure). The front-wheel pressure control processing executed in step S79 is identical to that executed in step S49, and thus detailed description of step S79 will be omitted to avoid repetition of the description. After step S79, step S80 proceeds. The procedure returns to the main program through step S80. The vehicle dynamics control routine is executed as time-triggered interrupt routines to be triggered every predetermined time intervals, while a right-hand or left-hand turn is made.

As will be appreciated from the above, first of all, the vehicle dynamics control system of the first embodiment, decides whether the vehicle's cornering behavior is the left-turn understeer, the left-turn oversteer, the right-turn understeer, or the right-turn oversteer. The system is responsive to results of decision for the vehicle's cornering behavior for properly regulating the fluid pressure in each of the wheel-brake cylinders and consequently avoid undesired understeer or oversteer, as briefly described later.

Figure 12:
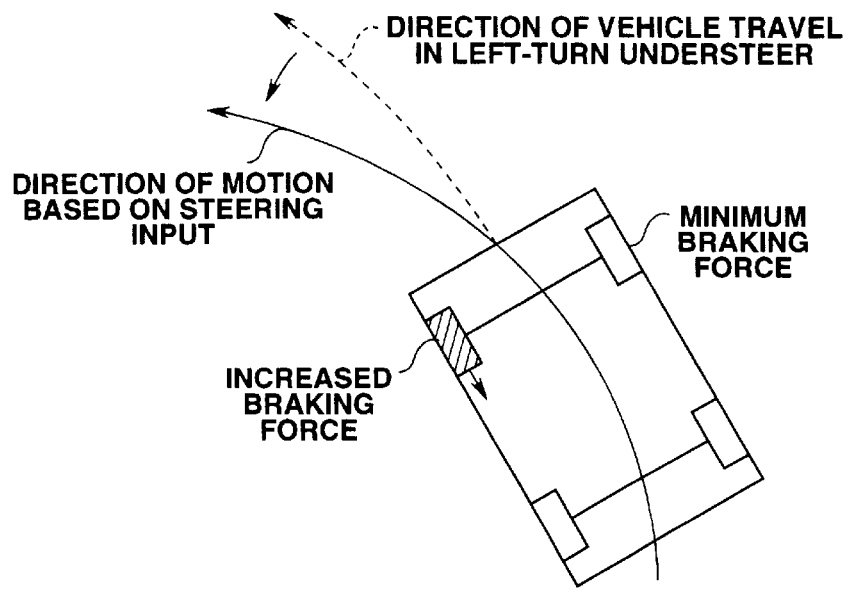
FIG. 12 is an explanatory view showing the operation of the vehicle dynamics control system of the invention for avoidance of left-turn understeer.

As seen in FIG. 12, when the vehicle is in the left-turn understeer state, the system permits the fluid pressure generated from the pump 13 to be directed or fed to the first brake line 5, by switching the fluid-pressure selector valve 19 to the shut-off position based on instructions from the control unit 43. Thus, the system operates to properly build up the fluid pressure in the front-left wheel cylinder 1 (corresponding to the inner front wheel cylinder) on the basis of the deviation from the target front-left wheel slip rate $Sd_{FL}$ (that is, the difference ($Sd_{FL}-S_{FL}$) between the target front-left wheel slip rate and the calculated front-left wheel slip rate), and simultaneously to reduce the fluid pressure in the front-right wheel-brake cylinder 2 to the minimum pressure level, by switching the fluid-pressure control valves 20 through 23 to their desired positions based on instructions from the control unit 43. This properly increases the braking force acting on the front-left road wheel and reduce the braking force acting on the front-right road wheel to the minimum, thereby resulting in a reasonable yawing moment about the z-axis in the anti-clockwise direction, effectively counter-acting the left-turn understeer, and compensating for the undesired left-turn understeer towards neutral steer.

Figure 13:
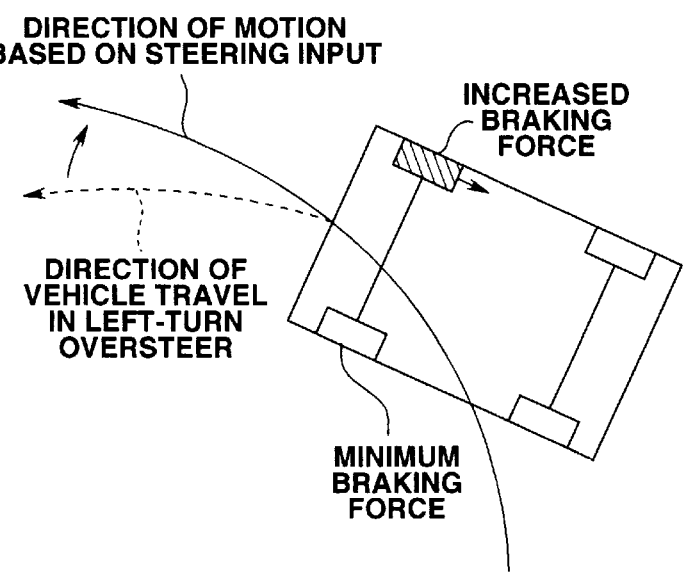
FIG. 13 is an explanatory view showing the operation of the vehicle dynamics control system of the invention for avoidance of left-turn oversteer.

As seen in FIG. 13, when the vehicle is in the left-turn oversteer state, the system permits the fluid pressure generated from the pump 13 to be directed or fed to the first brake line 5 by switching the fluid-pressure selector valve 19 to the shut-off position based on instructions from the control unit 43. Thus, the system operates to properly build up the fluid pressure in the front-right wheel cylinder 2 (corresponding to the outer front wheel cylinder) on the basis of the deviation from the target front-right wheel slip rate $Sd_{FR}$ (that is, the difference ($Sd_{FR}-S_{FR}$) between the target front-right wheel slip rate and the calculated front-right wheel slip rate), and simultaneously to reduce the fluid pressure in the front-left wheel-brake cylinder 1 to the minimum pressure level, by switching the fluid-pressure control valves 20 through 23 to their desired positions based on instructions from the control unit 43. This properly increases the braking force acting on the front-right road wheel and reduce the braking force acting on the front-left road wheel to the minimum, thereby resulting in a reasonable yawing moment about the z-axis in the clockwise direction, effectively counter-acting the left-turn oversteer, and compensating for the undesired left-turn oversteer towards neutral steer.

Figure 14:
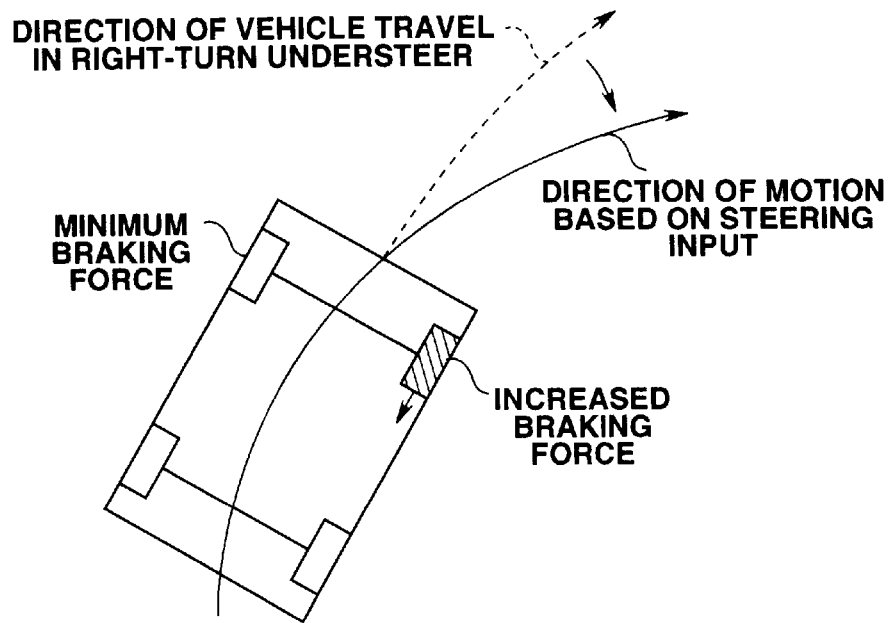
FIG. 14 is an explanatory view showing the operation of the vehicle dynamics control system of the invention for avoidance of right-turn understeer.

As seen in FIG. 14, when the vehicle is in the right-turn understeer state, the system operates in the same manner as the brake-fluid pressure control counter-acting the left-turn oversteer as shown in FIG. 13. That is, the system operates to properly build up the fluid pressure in the front-right wheel cylinder 2 (corresponding to the inner front wheel cylinder) on the basis of the deviation from the target front-right wheel slip rate $Sd_{FR}$, and simultaneously to reduce the fluid pressure in the front-left wheel-brake cylinder 1 to the minimum pressure level. This properly increases the braking force acting on the front-right road wheel and reduce the braking force acting on the front-left road wheel to the minimum, thereby resulting in a reasonable yawing moment about the z-axis in the clockwise direction, effectively counter-acting the right-turn understeer, and compensating for the undesired right-turn understeer towards neutral steer.

Figure 15:
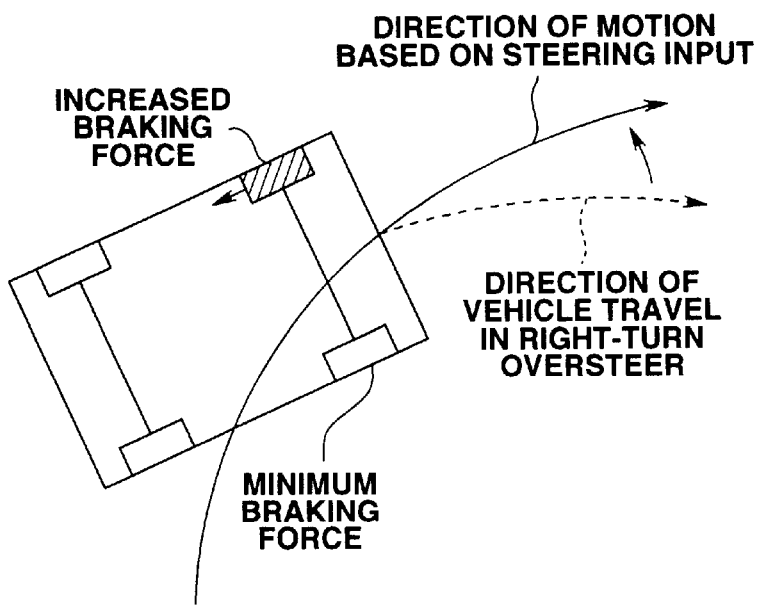
FIG. 15 is an explanatory view showing the operation of the vehicle dynamics control system of the invention for avoidance of right-turn oversteer.

As seen in FIG. 15, when the vehicle is in the right-turn oversteer state, the system operates in the same manner as the brake-fluid pressure control counter-acting the left-turn understeer as shown in FIG. 12. That is, the system operates to properly build up the fluid pressure in the front-left wheel cylinder 1 (corresponding to the outer front wheel cylinder) on the basis of the deviation from the target front-left wheel slip rate $Sd_{FL}$, and simultaneously to reduce the fluid pressure in the front-right wheel-brake cylinder 2 to the minimum pressure level. This properly increases the braking force acting on the front-left road wheel and reduce the braking force acting on the front-right road wheel to the minimum, thereby resulting in a reasonable yawing moment about the z-axis in the anti-clockwise direction, effectively counter-acting the right-turn oversteer, and compensating for the undesired right-turn oversteer towards neutral steer.

As set forth above, the system of the embodiment can avoid undesired vehicle's cornering behavior such as understeer or oversteer tendencies, accounting for rear-to-front load transfer on turns. In case of either avoidance of understeer or avoidance of oversteer, a braking force applied to one of the two front road wheels is properly increased and a braking force applied to the other front road wheel is reduced to the minimum according to the vehicle dynamics control discussed above. This creates a yawing moment effectively eliminating or counter-acting understeer or oversteer tendencies on turns. In the understeer state on turns, the system functions to increase a yawing moment about the z-axis, acting in a direction of turn of the vehicle. In the oversteer state on turns, the system functions to increase a yawing moment about the z-axis, acting in a direction opposite to the direction of turn of the vehicle. Furthermore, according to the system of the embodiment, when the vehicle experiences understeer or oversteer on turns, the braking force of each individual front road wheel is automatically controlled by means of the control pump 13 and the fluid-pressure control valves 20–23. Note that the system of the embodiment permits the master-cylinder pressure to be applied via the second brake line 6 (the rear-wheel side brake line) to the rear wheel-brake cylinders 3 and 4, even when the braking force of each of the front road wheels is automatically controlled in accordance with the vehicle dynamics control. That is to say, even during the vehicle dynamics control for the front wheel-brake cylinders 1 and 2, the rear-left and rear-right wheel-brake cylinder pressures can be changed or regulated depending on the magnitude of the driver's brake-pedal depression. Thus, in the system of the embodiment, the vehicle can be decelerated according to the driver's wishes. Moreover, in the event that the vehicle dynamics control system is damaged or malfunctioning, the system permits the master-cylinder pressure to be directed to the second parallel pair of wheel-brake cylinders, namely the rear wheel-brake cylinder 3 and 4, and thus the vehicle can be decelerated even in the presence of the vehicle dynamics control system's failure or malfunction.

It will be appreciated that the fundamental concept of the present invention may be applicable to various types of automotive vehicles having a so-called parallel split layout of brake circuits, namely a front-engine, front-wheel-drive (FF) vehicles with a parallel split layout of brake circuits, a four-wheel-drive (4WD) vehicles with a parallel split layout of brake circuits, as well as a front-engine, rear-wheel-drive (FR) vehicles with a parallel split layout of brake circuits.

The fundamental concept of the vehicle dynamics control system of the invention will be hereinafter described in brief by reference to the block diagram shown in FIG. 1.

Figure 1:
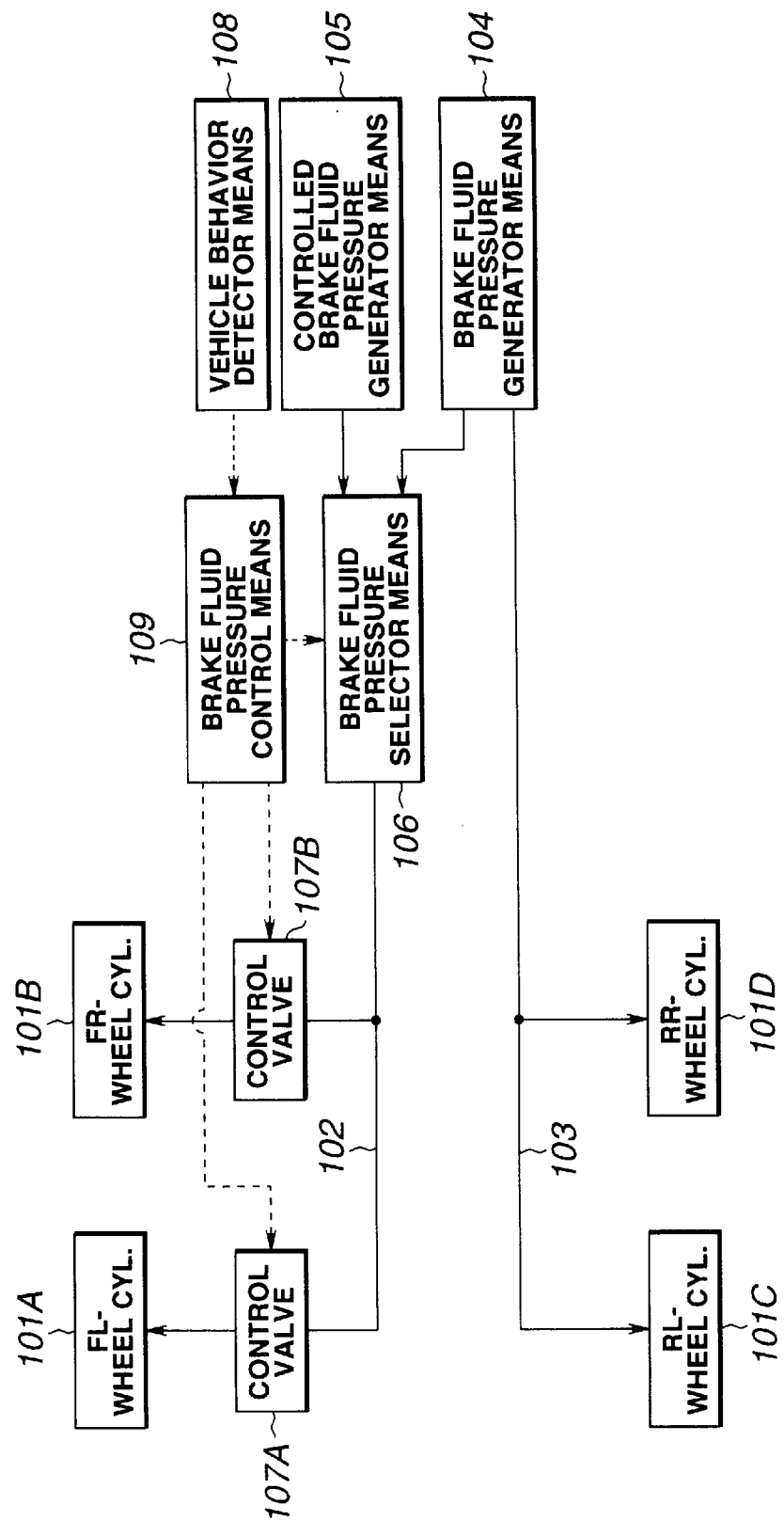
FIG. 1 is a block diagram illustrating a fundamental concept of a vehicle dynamics control system according to the invention.

As seen in FIG. 1, when the brake fluid pressure control means 109 determines that the vehicle is in the understeer state on turns, on the basis of results detected by the vehicle behavior detector means 108, the system operates to supply the fluid pressure generated from the controlled brake fluid pressure generator means 105 to the inner front wheel-brake cylinder of the front-left and front-right wheel-brake cylinders 101A through 101B. When the brake-fluid pressure control means 109 determines that the vehicle is in the oversteer state on turns, the system operates to supply the fluid pressure generated from the controlled brake-fluid pressure generator means 105 to the outer front wheel-brake cylinder of the two front wheel-brake cylinders 101A through 101B. With the previously-noted arrangement, for example when the left-turn understeer state is detected by the vehicle-behavior detector means 108, the brake-fluid pressure control means 109 operates the brake-fluid pressure selector means 106 in such a manner as to direct or feed the fluid pressure generated from the controlled brake-fluid pressure generator means 105 to the first brake line 102 connected to the front wheel-brake cylinders 101A and 101B, and simultaneously operates the fluid-pressure control valves 107A and 107B in such a manner as to direct or feed the fluid pressure output from the controlled brake-fluid pressure generator means 105 to the front-left wheel-brake cylinder 101A (corresponding to the inner front wheel cylinder). As a result, the braking force acting on the front-left road wheel is increased as compared with the other road wheels and thus a yawing moment acting anti-clockwise about the z-axis is increased. Therefore, the left-turn understeer tendency can be effectively compensated for toward neutral steer. When the left-turn oversteer state is detected by the vehicle-behavior detector means 108, the brake-fluid pressure control means 109 operates the brake-fluid pressure selector means 106 in such a manner as to direct or feed the fluid pressure generated from the controlled brake-fluid pressure generator means 105 to the first brake line 102 associated with the front wheel-brake cylinders, and simultaneously operates the fluid-pressure control valves 107A and 107B in such a manner as to direct or feed the fluid pressure output from the controlled brake-fluid pressure generator means 105 to the front-right wheel-brake cylinder 101B (corresponding to the outer front wheel cylinder). As a result, the braking force acting on the front-right road wheel is increased as compared with the other road wheels and thus a yawing moment acting clockwise about the z-axis is increased (in other words, a yawing moment acting anti-clockwise about the z-axis is suppressed). As a consequence, the left-turn oversteer tendency can be effectively compensated for toward neutral steer. When the right-turn understeer state is detected by the vehicle-behavior detector means 108, the brake-fluid pressure control means 109 operates the brake-fluid pressure selector means 106 in such a manner as to direct or feed the fluid pressure generated from the controlled brake-fluid pressure generator means 105 to the first brake line 102, and simultaneously operates the fluid-pressure control valves 107A and 107B in such a manner as to direct or feed the fluid pressure output from the controlled brake-fluid pressure generator means 105 to the front-right wheel-brake cylinder 101B (corresponding to the inner front wheel cylinder). As a result, the braking force acting on the front-right road wheel is increased as compared with the other road wheels and thus a yawing moment acting clockwise about the z-axis is increased. As a consequence, the right-turn understeer tendency can be effectively compensated for toward neutral steer. Conversely, when the right-turn oversteer state is detected by the vehicle-behavior detector means 108, the brake-fluid pressure control means 109 operates the brake-fluid pressure selector means 106 in such a manner as to direct or feed the fluid pressure generated from the controlled brake-fluid pressure generator means 105 to the first brake line 102, and simultaneously operates the fluid-pressure control valves 107A and 107B in such a manner as to direct or feed the fluid pressure output from the controlled brake-fluid pressure generator means 105 to the front-left wheel-brake cylinder 101A (corresponding to the outer front wheel cylinder). As a result, the braking force acting on the front-left road wheel is increased as compared with the other road wheels and thus a yawing moment acting clockwise about the z-axis is effectively suppressed. Therefore, the right-turn oversteer tendency can be effectively compensated for toward neutral steer. Preferably, the fluid-pressure control means 109 of the system of FIG. 1 operates to reduce the brake-fluid pressure in the outer front wheel-brake cylinder of the two front wheel-brake cylinders 101A and 101B when the understeer state is detected by the vehicle-behavior detector means 108 during turns, and operates to reduce the brake-fluid pressure in the inner front wheel-brake cylinder of the two front wheel-brake cylinders 101A and 101B when the oversteer state is detected by the vehicle-behavior detector means 108 during turns. According to the preferable arrangement, in the left-turn understeer state, the front-right wheel-brake cylinder pressure a(corresponding to the outer front wheel-brake cylinder pressure) is reduced, and thus a yawing moment acting anti-clockwise about the z-axis is increased. As a result, during the left-turn understeer state, the direction of actual vehicle travel is compensated for toward the direction of desired vehicle motion based on steering input. This avoids the understeer tendency. On the contrary, when the left-turn oversteer state is detected by the vehicle-behavior detector means 108, the front-left wheel-brake cylinder pressure (corresponding to the front inner wheel-brake cylinder pressure) is reduced, and thus a yawing moment acting anti-clockwise about the z-axis is effectively suppressed. As a result, during the left-turn oversteer state, the direction of actual vehicle travel is compensated for toward the direction of desired vehicle motion based on steering input, thereby avoiding the oversteer tendency. Likewise, in the right-turn understeer state, the front-left wheel-brake cylinder pressure (corresponding to the outer front wheel-brake cylinder pressure) is reduced, and thus a yawing moment acting clockwise about the z-axis is increased to effectively avoid the understeer tendency. Conversely, in the right-turn oversteer state, the front-right wheel-brake cylinder pressure (corresponding to the inner front wheel-brake cylinder pressure) is reduced, and thus a yawing moment acting clockwise about the z-axis is suppressed to effectively avoid the oversteer tendency. More preferably, in the system of FIG. 1, the brake-fluid pressure control means 109 permits the fluid pressure output from the brake-fluid pressure generator means 104 (the master cylinder) to be directed or fed to a brake line 103 connected to the two rear wheel-brake cylinders 101C and 101D, even when the braking force of the front-left or front-right road wheels is controlled or regulated in accordance with the vehicle dynamics control routine to avoid understeer or oversteer tendencies during turns. The braking force applied to the rear road wheels can be properly changed depending on the magnitude of the brake-pedal depression (or the driver's wishes).

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicle dynamics control system for an automotive vehicle with a parallel split layout of brake circuits, said system comprising:

a first brake line connected to a pair of front-left and front-right wheel-brake cylinders;

a second brake line connected to a pair of rear-left and rear-right wheel-brake cylinders;

a first brake-fluid pressure generator for generating a first brake-fluid pressure which is variable depending on a magnitude of brake-pedal depression;

a second brake-fluid pressure generator for generating a second brake-fluid pressure, independently of said first brake-fluid pressure based on the magnitude of brake-pedal depression;

a brake-fluid pressure selector valve means for selecting a brake-fluid pressure to be fed to said first brake line from between said first and second brake-fluid pressures;

a first pressure control valve means fluidly disposed in a first brake circuit including said first brake line for regulating a fluid pressure in said front-left wheel-brake cylinder;

a second pressure control valve means fluidly disposed in said first brake circuit including said first brake line for regulating a fluid pressure in said front-right wheel-brake cylinder;

a vehicle-behavior detector for detecting a vehicle's cornering behavior; and a brake-fluid pressure control means being responsive to input information from said vehicle-behavior detector for controlling said brake-fluid pressure selector valve means and said first and second pressure control valve means;

wherein said brake-fluid pressure control means operates to supply said second brake-fluid pressure to an inner front wheel-brake cylinder of said front-left and front-right wheel-brake cylinders for increasing a fluid pressure in the inner front wheel-brake cylinder and operates to reduce a fluid pressure in an outer front wheel-brake cylinder of said front-left and front-right wheel-brake cylinders to a predetermined minimum brake-fluid pressure level when said input information from said vehicle-behavior detector indicates a vehicle understeer during a turn, and said brake-fluid pressure control means operates to supply said second brake-fluid pressure to an outer front wheel-brake cylinder of said front-left and front-right wheel-brake cylinders for increasing a fluid pressure in the outer front wheel-brake cylinder and operates to reduce a fluid pressure in an inner front wheel-brake cylinder of said front-left and front-right wheel-brake cylinders to a predetermined minimum brake-fluid pressure level when said input information from said vehicle-behavior detector indicates a vehicle oversteer during a turn.

2. The vehicle dynamics control system as claimed in claim 1, wherein said first brake-fluid pressure generator comprises a dual-brake system master cylinder with two pistons set in tandem.

3. The vehicle dynamics control system as claimed in claim 1, wherein said second brake-fluid pressure generator comprises a single-directional type electric-motor driven hydraulic pump being disposed in said first brake circuit.

4. The vehicle dynamics control system as claimed in claim 1, wherein said vehicle-behavior detector comprises at least wheel speed sensors for monitoring front-left, front-right, rear-left and rear-right wheel speeds, a yaw-velocity sensor for monitoring a yaw velocity about a z-axis of the vehicle, a lateral acceleration sensor for monitoring a lateral acceleration exerted on the vehicle, and a steering angle sensor for monitoring a steer angle.

5. A vehicle dynamics control system for an automotive vehicle with a parallel split layout of brake circuits, said system comprising:

a first brake line connected to a pair of front-left and front-right wheel-brake cylinders;

a second brake line connected to a pair of rear-left and rear-right wheel-brake cylinders;

a first brake-fluid pressure generator for generating a first brake-fluid pressure which is variable depending on a magnitude of brake-pedal depression;

a second brake-fluid pressure generator for generating a second brake-fluid pressure, independently of said first brake-fluid pressure based on the magnitude of brake-pedal depression;

a brake-fluid pressure selector valve for selecting a brake-fluid pressure to be fed to said first brake line from between said first and second brake-fluid pressures;

a first group of pressure control valves fluidly disposed in a first brake circuit including said first brake line for regulating a fluid pressure in said front-left wheel-brake cylinder;

a second group of pressure control valves fluidly disposed in said first brake circuit including said first brake line for regulating a fluid pressure in said front-right wheel-brake cylinder;

a vehicle-behavior detector for detecting a vehicle's cornering behavior; and a control unit being configured to be connected to said vehicle-behavior detector for controlling said brake-fluid pressure selector valve and said first and second groups of pressure control valves in response to input information from said vehicle-behavior detector;

wherein said control unit operates to supply said second brake-fluid pressure to an inner front wheel-brake cylinder of said front-left and front-right wheel-brake cylinders for increasing a fluid pressure in the inner front wheel-brake cylinder and operates to reduce a fluid pressure in an outer front wheel-brake cylinder of said front-left and front-right wheel-brake cylinders to a predetermined minimum brake-fluid pressure level when said input information from said vehicle-behavior detector indicates a vehicle understeer during a turn, and said control unit operates to supply said second brake-fluid pressure to an outer front wheel-brake cylinder of said front-left and front-right wheel-brake cylinders for increasing a fluid pressure in the outer front wheel-brake cylinder and operates to reduce a fluid pressure in an inner front wheel-brake cylinder of said front-left and front-right wheel-brake cylinders to a predetermined minimum brake-fluid pressure level when said input information from said vehicle-behavior detector indicates a vehicle oversteer during a turn.

6. The vehicle dynamics control system as claimed in claim 5, wherein said first brake-fluid pressure generator comprises a dual-brake system master cylinder with two pistons set in tandem.

7. The chicle dynamics control system as claimed in claim 5, wherein said second brake-fluid pressure generator comprises a single-directional type electric-motor driven hydraulic pump being disposed in said first brake circuit.

8. The vehicle dynamics control system as claimed in claim 5, wherein said vehicle-behavior detector comprises at least wheel speed sensors for monitoring front-left, front-right, rear-left and rear-right wheel speeds, a yaw-velocity sensor for monitoring a yaw velocity about a z-axis of the vehicle, a lateral acceleration sensor for monitoring a lateral acceleration exerted on the vehicle, and a steering angle sensor for monitoring a steer angle.

* * * * *